H. A. MARTIN.
REGISTERING MACHINE.
APPLICATION FILED JUNE 26, 1915.

1,348,573.

Patented Aug. 3, 1920.
8 SHEETS—SHEET 1.

Inventor
HAAKON A. MARTIN
Attorneys

H. A. MARTIN.
REGISTERING MACHINE.
APPLICATION FILED JUNE 26, 1915.

1,348,573.

Patented Aug. 3, 1920.
8 SHEETS—SHEET 3.

Inventor
HAAKON A. MARTIN
by
Carl Beust
Attorneys

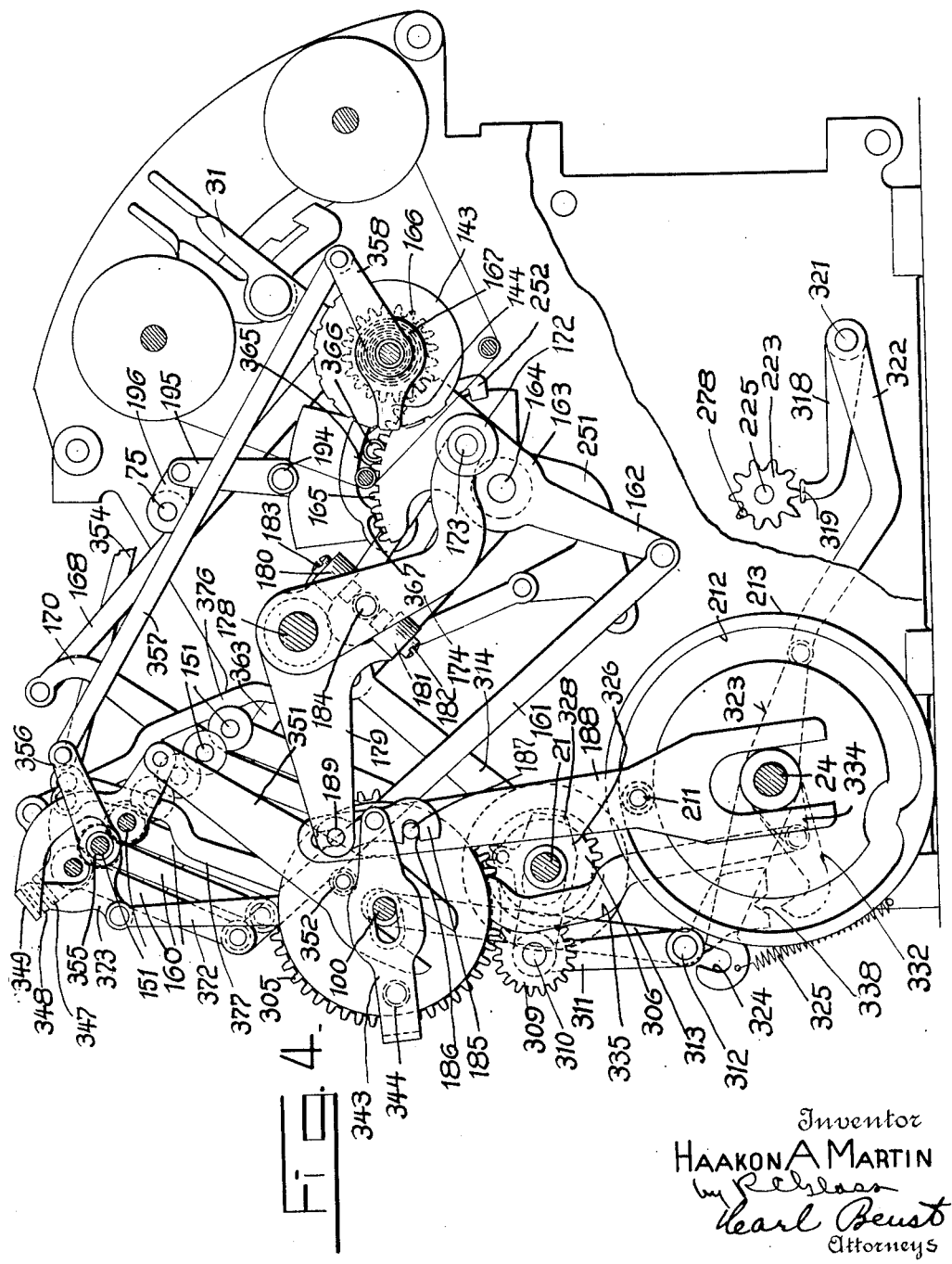

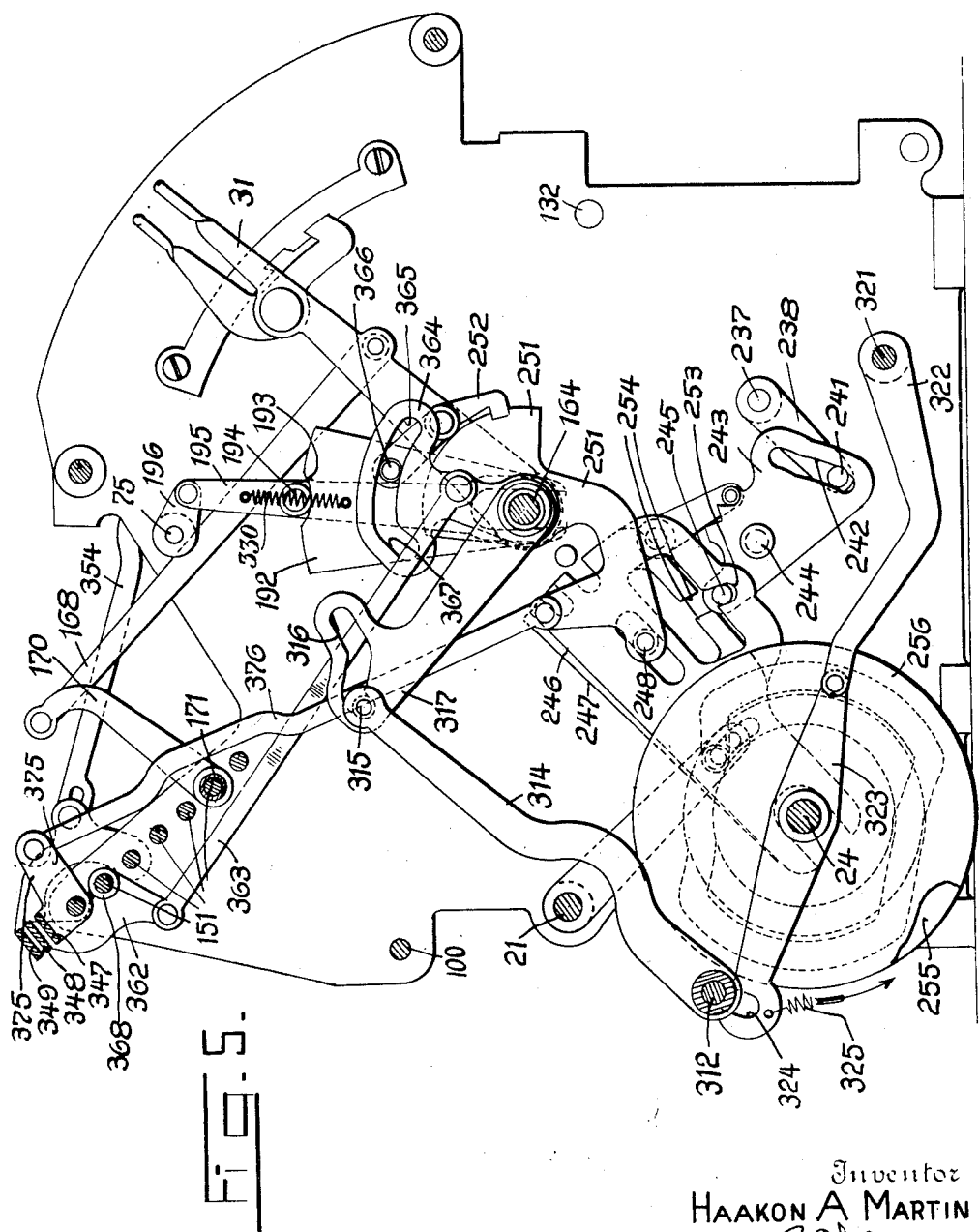

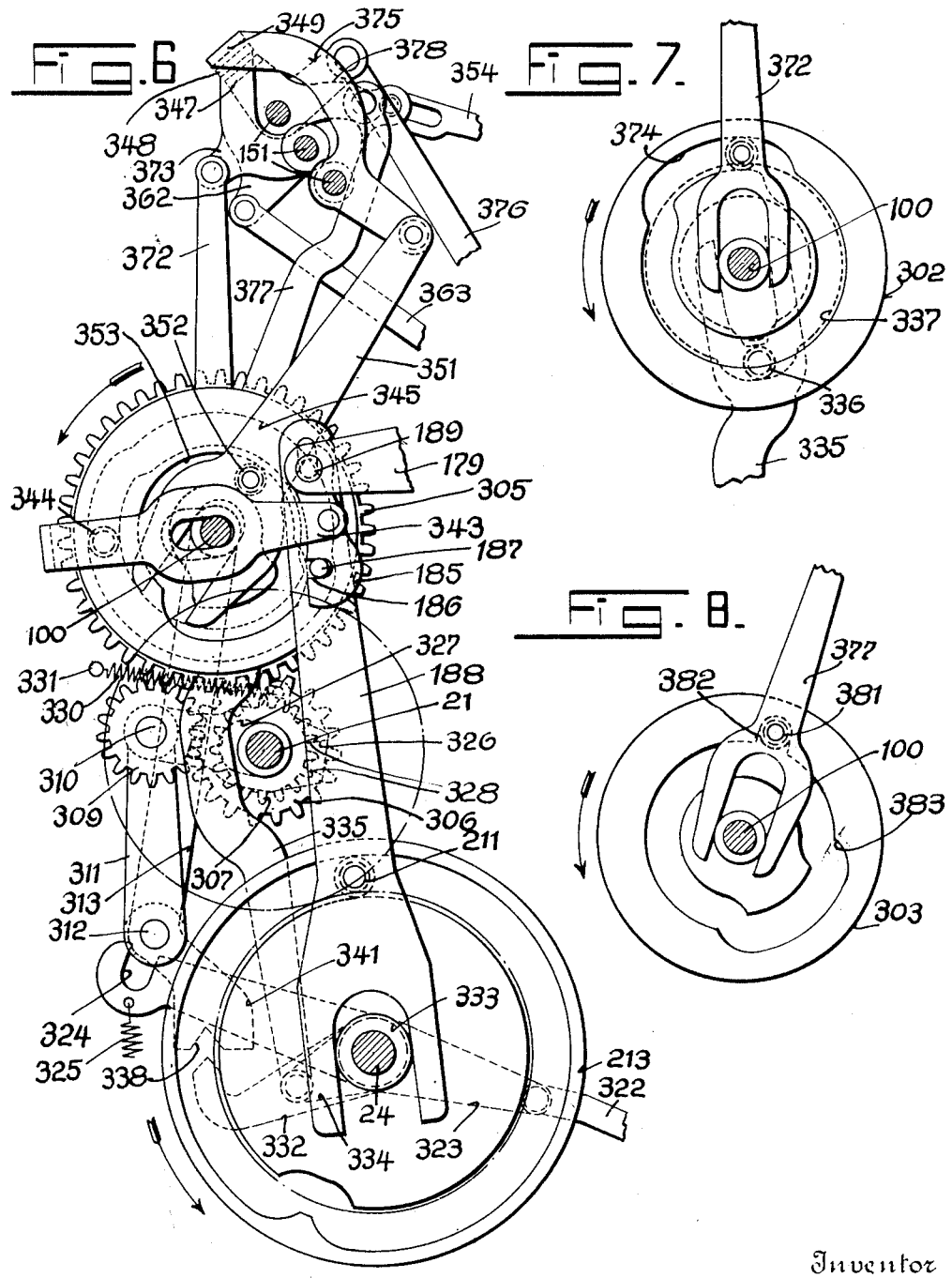

H. A. MARTIN.
REGISTERING MACHINE.
APPLICATION FILED JUNE 26, 1915.
1,348,573.
Patented Aug. 3, 1920.
8 SHEETS—SHEET 7.
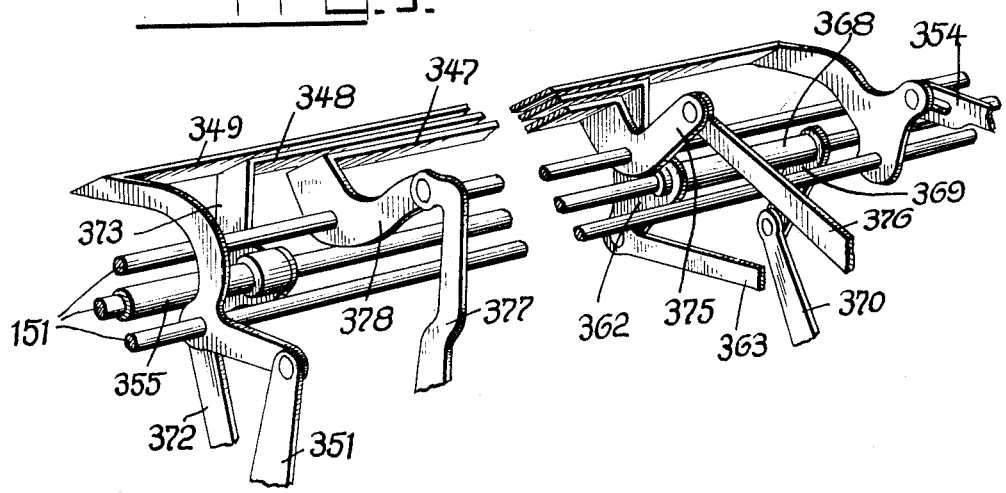
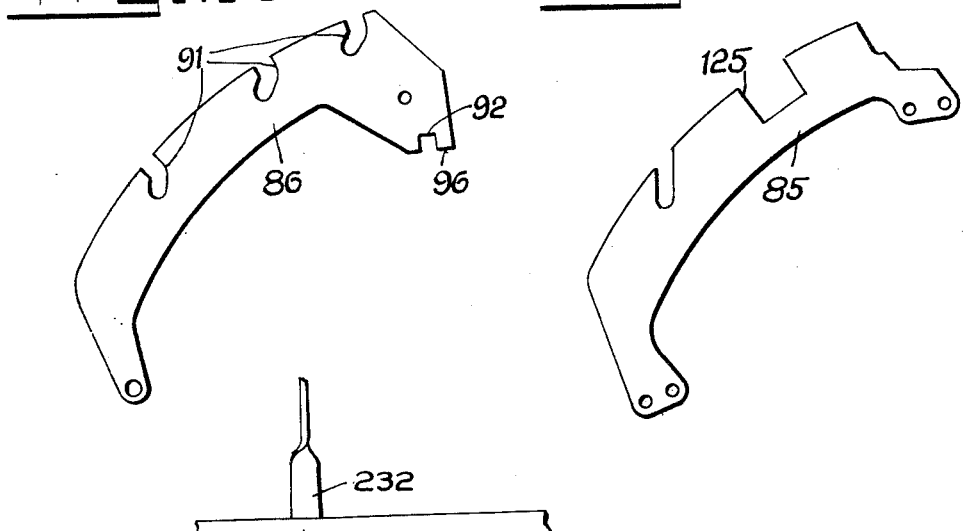
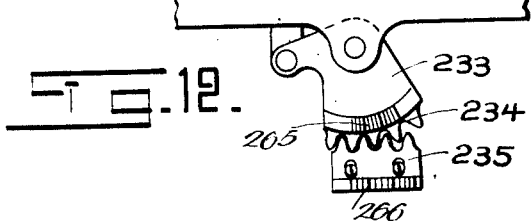
Inventor
HAAKON A. MARTIN
Attorneys

H. A. MARTIN.
REGISTERING MACHINE.
APPLICATION FILED JUNE 26, 1915.

1,348,573.

Patented Aug. 3, 1920.
8 SHEETS—SHEET 8.

```
★  Dr. 0225.00
★  Cr. 0066.75
★  Cr. 0055.00
★  Cr. 0050.00
T  T. 0053.25

★  Dr. 0375.00
★  Cr. 0200.00
★  Cr. 0050.00
★  Cr. 0025.00
★  Dr. 0100.00
★  Cr. 0250.00
- T  T. 0050.00
```

Inventor
HAAKON A. MARTIN

Attorney

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

REGISTERING-MACHINE.

1,348,573.　　　　　Specification of Letters Patent.　　Patented Aug. 3, 1920.

Application filed June 26, 1915. Serial No. 36,467.

*To all whom it may concern:*

Be it known that I, HAAKON A. MARTIN, a citizen of the United States, residing at Dayton, in the county of Montgomery and State of Ohio, have invented certain new and useful Improvements in Registering-Machines, of which I declare the following to be a full, clear, and exact description.

This invention relates to improvements in accounting machines of the kind generally called adding and subtracting machines for the reason that they both add and subtract by direct process instead of, as is the case with the ordinary adding machine, being so constructed that the difference between two amounts can only be obtained by the process of adding complementary amounts.

The main object of the invention is to provide machines of the type mentioned with improved mechanism for obtaining a negative total, that is, the amount by which the total of subtractions has exceeded the total of additions. This, of course, involves the problem of correcting a negative amount to show the true negative total, the correction being necessary to off-set the condition resulting from the operation of the carrying and borrowing devices.

In the present embodiment of the idea a single set of actuators is used in connection with a sliding totalizer comprising a set of adding and a set of subtracting elements. In item entering either the adding or the subtracting elements may be engaged with the actuators during movement of the latter in one direction. In total taking the totalizer is cleared by engaging the adding elements with the actuators during movement of the actuators in the opposite direction. This effects the usual differential adjustment of the actuators and the type carriers are then positioned according to the setting of the actuators. If the amount taken from the adding elements is positive the impression is at once taken from the type carriers and the actuators restored to the normal starting point. If, however, the amount taken from the adding wheels is negative, mechanism controlled by the totalizer is brought into play whereby before an impression is taken from the type carriers, the adding elements are disengaged and the subtracting elements engaged with the actuators before the actuators are restored from their differentially adjusted to their normal positions. As a result, the restoring movement of the actuators causes operation of the subtracting elements. One of the objects of the invention is to provide satisfactory mechanism controlled by the totalizer whereby such a transfer of amounts from one set of totalizer elements to another is automatically effected.

The purpose of reëntering an amount in the totalizer, as just described, is to permit using the regular carrying or borrowing mechanism to make the correction in the negative amount. The way in which the correction is made will be fully explained later. It is sufficient to state here that after the reëntry is completed the adding elements will be set to represent the true negative total. This correcting operation takes up all of a single cycle of movement or ordinary operation of the machine. To print the negative total it is necessary to clear the totalizer a second time with the adding elements again in engagement with the actuators, thereby effecting differential adjustment of the actuators to represent the correct negative total. The type carriers are then set to correspond to the adjusted positions of the actuators and the negative total printed. This second clearing of the totalizer and the printing of the negative total is automatically effected by mechanism controlled by the totalizer which permits the operating mechanism to have two cycles of movement in negative total taking operations instead of but one as in item entering operations or in operations to print positive totals. Such an arrangement makes the machine much more convenient and satisfactory to use than if the manipulative devices normally controlling the operating mechanism had to be manipulated to release the mechanism so as to permit the second cycle of movement to print the negative total. Providing the improved mechanism whereby this result is possible constitutes another object of the invention.

Still another object of the invention is to provide mechanism for automatically preventing an impression from being taken from the type carriers when the carriers have been adjusted under the control of the totalizer and the amount is one that should not be printed.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figure 2:
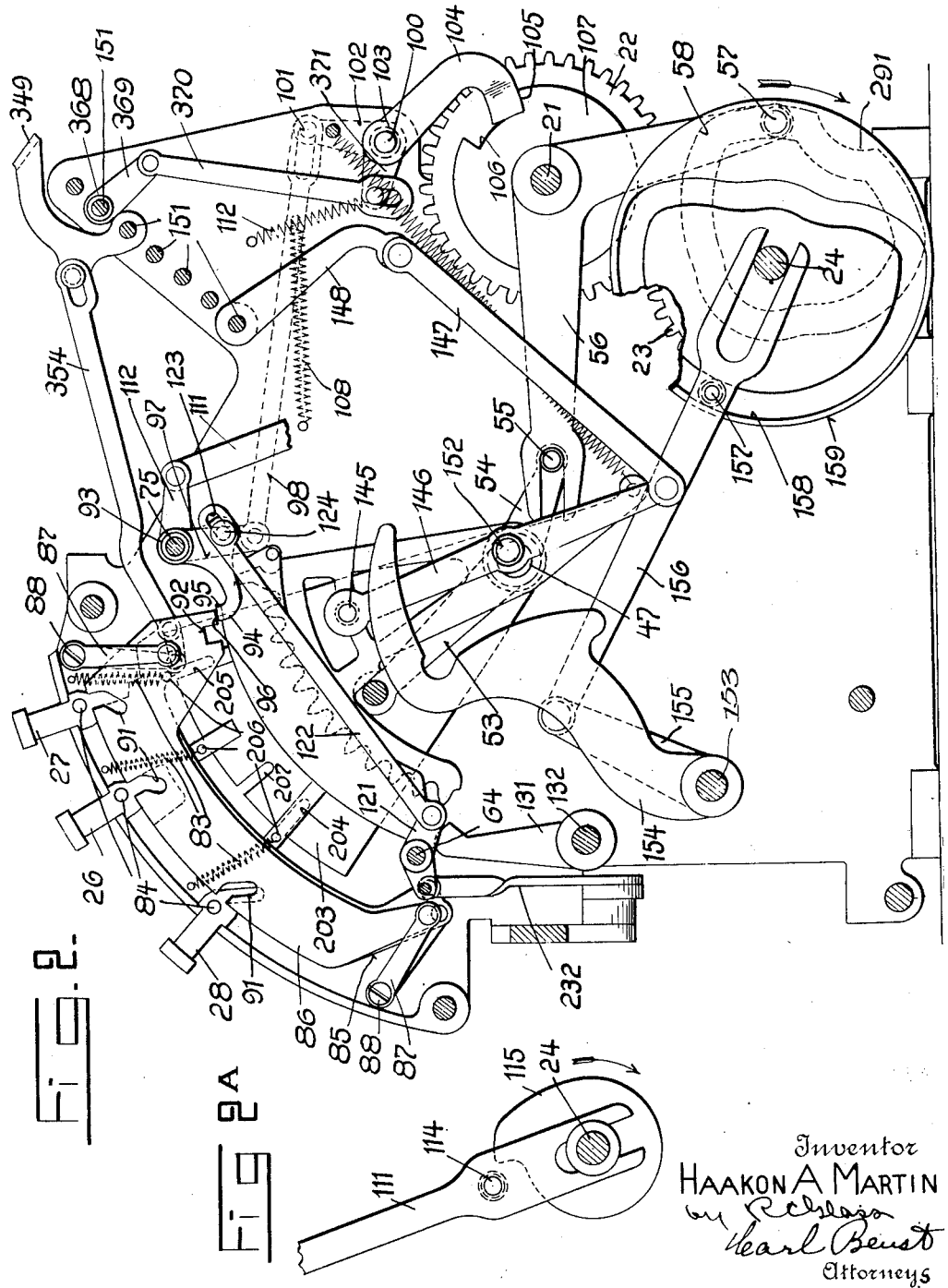
Fig. 2 is a section taken on the line X—X of Fig. 3, and shows, among other things, the construction of the special key bank.

Fig. 2ª is a detail of a cam and pitman for releasing the special keys.

Figure 3:
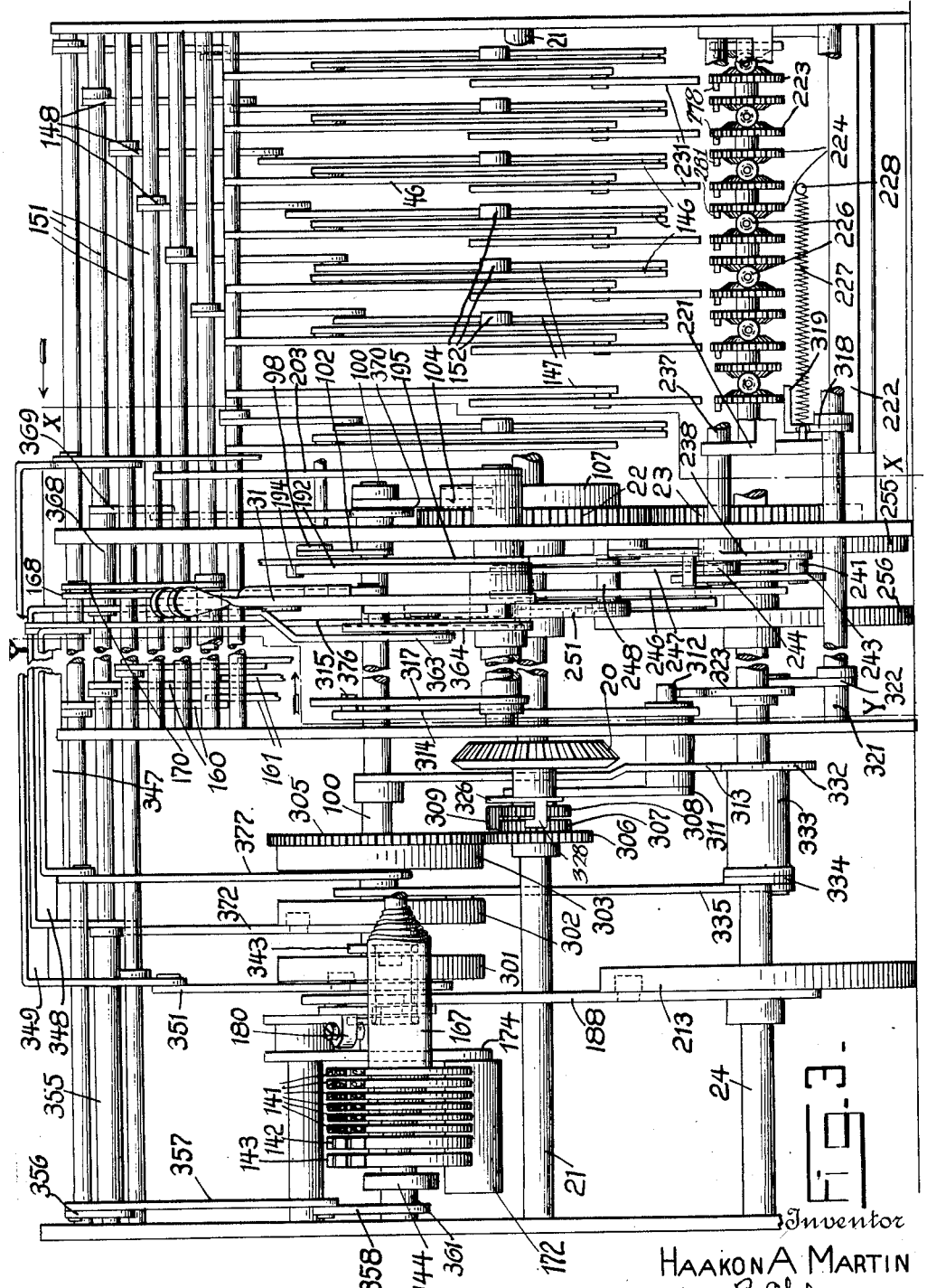

Fig. 3 is a front elevation of the mechanism with certain of the parts omitted and others broken away, the object being to show the relative positions of certain of the parts.

Fig. 4 is a section through the machine just inside of the left hand side frame and with the second frame from the left omitted to show clearly the printing mechanism and certain features of the mechanism for obtaining and printing negative totals.

Fig. 5 is a section taken on the line Y—Y of Fig. 3 and shows the devices controlled by the total taking lever and the totalizer.

Fig. 6 is a detail in left side elevation and shows a part of the platen mechanism and some of the auxiliary mechanism called into play during a total taking operation when the totalizer is in a negative condition.

Figs. 7 and 8 are details of cams forming a part of the negative total taking mechanism.

Fig. 9 is a perspective, partly broken away, of some of the operating mechanism controlled by the totalizer.

Figs. 10 and 11 are details of plates cooperating with the special keys.

Fig. 12 is a detail of part of the mechanism for shifting the totalizer carriage from one position to another.

Figures 13, 14:
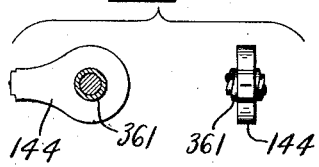

Fig. 13 is a part of a detail strip printed by the machine.

Fig. 14 shows a left side view and a rear view of the type carrier for printing a character to designate negative totals.

The improved machine shown in the drawings is designed to meet the needs of banks and other places of business where a number of debits and credits are made to the same account. It is, therefore, equipped with a debit key and a credit key and prints characters representing debits and credits, but the invention is capable of general application to adding and subtracting machines and, for the sake of clearness and simplicity, the words adding and subtracting, or positive and negative, are usually used hereinafter when referring to parts or operations instead of the corresponding words credit and debit.

In the present instance, the machine has no indicators or grand totalizer, and instead of a sliding set of department totalizers a sliding adding and subtracting totalizer is employed, but in all other respects the main machine is substantially the same as the one shown and described in application No. 696,103 for U. S. Letters Patent filed May 9, 1912, by H. A. Martin (now Patent No. 1,181,238, dated April 28, 1914). The present invention also employs certain totalizer controlled mechanism shown and described in another application for United States Letters Patent filed April 15, 1914, by H. A. Martin, application No. 831,923 (now Patent No. 1,294,507, dated February 18, 1919). In fact, the present invention is in a way designed to be an improvement over the mechanism in the application last mentioned. Only the features essential to the present invention are described in detail herein and reference should be made to the two prior applications (now Patents Nos. 1,181,238 and 1,294,507) if, for any reason, more complete information regarding the older features of construction should be desired.

The improved machine has a key-board comprising value keys, special keys, and a manually adjustable lever, the value keys controlling the entering of amounts, the special keys controlling a machine lock and the mechanism whereby adding or subtracting may be effected as desired, while the position at which the manually adjustable lever is set determines whether at the succeeding operation of the machine an item is to be entered or a total taken. A set of type carriers is provided having suitable connections for adjusting the carriers to print full information regarding items entered. On total taking operations the type carriers are adjusted to print characters showing that the total taking mechanism has been operated, whether the total is positive or negative and the amount of the total.

The operating mechanism comprises a main driving mechanism and totalizer actuators of the oscillatory type. In an item entering operation the value bank actuators are first differentially adjusted under the control of the amount keys. The totalizer is then engaged and the actuators restored, thereby entering in the totalizer the amount represented by the operated keys. The totalizer has an adding and a subtracting element for each denomination, the two elements bearing a complementary relation one to the other and being geared together in such a way that rotation of either element in one direction will effect rotation of the other to the same extent but in the opposite direction. The sets of elements are all mounted in a carriage movable to effect engagement of either the adding or the subtracting elements with the actuators during the return to normal or actuating stroke of the actuators as above mentioned. As a result of this construction, the adding elements are advanced in adding operations and reversely rotated when the totalizer is operated with the subtracting elements in engagement with the actuators. In total taking the adding elements of the totalizer are engaged with the actuators before the actuators are permitted to move away from their normal starting point and when the actuators are released and operated they reversely rotate the adding elements to zero in the usual way, thereby setting up on the actuators the amount taken from the adding wheels. This reverse movement of the adding elements to zero is, of course, transmitted through the intermediate gears to the subtracting elements so that at the end of the resetting stroke of the actuators both the adding and the subtracting elements will have been set at zero. After the actuators have been thus differentially adjusted under the control of the adding elements, the type carriers are set to correspond to the position of the actuators and if the amount taken from the adding wheels is positive the printing impression is at once taken; but if the amount taken from the adding wheels is negative, that is, if the subtractions have exceeded the additions, mechanism controlled by the totalizer is brought into play which disables the impression devices and automatically disengages the adding elements and engages the subtracting elements with the actuators while the actuators are held in differentially adjusted position. Then when the actuators are released and restored the subtracting elements are differentially actuated, causing reverse rotation of the adding elements.

The actuators, which as before stated, are of the oscillatory type, in addition to differentially operating the totalizer perform both the carrying and borrowing operations. They are stopped upon their return to zero positions by pivoted arms or pawls normally projecting into their paths. To effect carrying and borrowing these pawls are tripped by either the adding or the subtracting elements of lower order whichever happens to be in engagement with the actuators, thereby allowing the actuators to have an added step of movement. The adding elements have tripping projections positioned to trip the pawls as the adding elements pass from 9 to 0 while the tripping projections on the subtracting elements are so positioned as to trip the transfer pawls as the subtracting elements pass from 0 to 1. This arrangement of the transfer mechanism in connection with the construction of the totalizer not only provides for the carrying and borrowing, but also forms a part of the novel mechanism for making the correction necessary to obtain the correct negative total.

In item entering operations when a minuend has been exceeded, that is, when the subtractions have exceeded the additions, the subtracting elements will have been so positioned that the right hand elements, or, in case the amount ends in ciphers, the right hand elements remaining at the zero position and the next higher order subtracting element will be correctly set, but each of the other higher order subtracting elements will have been rotated one step too far to represent the negative total correctly. The adding elements will at this time contain the complement of the incorrect negative amount, that is, the adding elements geared to the incorrectly set subtracting elements will be a step short of the positions they should occupy to represent correctly the complement of the true negative total. When the totalizer is in this incorrect negative condition and is cleared with the adding elements in engagement with the actuators and the incorrect complementary amount then reëntered on the subtracting elements in the manner before mentioned, the lowest order subtracting element that is advanced from its zero position during the reëntry will operate the next higher order transfer devices and this is repeated all the way across the totalizer, thereby causing all of the higher order subtracting elements to be given a step of movement in addition to any differential movement imparted to them by the actuators. The effect of thus actuating the subtracting elements and operating the transfers is to enter on the substracting elements an amount which is the same as the incorrect complementary amount cleared from the adding elements except that one will be added in the denominations which were one short on the adding elements. The result is that at the end of the reëntry the subtracting elements will contain the complement of the true negative total while the adding elements will have been reversely rotated through the connecting gearing to set the adding elements to show the correct negative total. The totalizer is then cleared a second time with the adding elements again in engagement with the actuators to effect correct differential adjustment of the actuators and subsequent printing of the correct negative total.

The automatic correction of the totalizer as just described is effected by mechanism called into play only in such total taking operations as may find the totalizer in a negative condition. When the substracting elements trip the transfer devices all of the way across the totalizer, the highest order subtracting element is, of course, advanced a single step. This effects reverse rotation of the highest order adding element to the same extent and carries a projection integral with the adding element into position to co-act with other devices in such a way that when the total lever is moved to the total taking position auxiliary mechanism for effecting the correction and other results incidental thereto are clutched to the main driving mechanism. The controlling projection on the highest order adding element is carried out of effective position when the totalizer is cleared at the beginning of the correcting operation, but suitable locking devices are provided for maintaining the clutch connection in effective condition until the correction has been made and the negative total printed, whereupon the locking devices are disabled to permit all of the devices affected to resume their normal relations.

The machine shown in the drawings is arranged to be driven by an electric motor (not shown) suitably connected to a beveled gear 20 (Fig. 3) fastened to a driving shaft 21 extending across the machine. A gear 22 (Fig. 2) fast on the shaft 21 meshes with a gear 23 attached to a second driving shaft 24 which also extends the full width of the machine. The arrangement is such that each of these shafts normally makes one complete rotation at each operation of the machine, but as above mentioned and as will be fully explained hereinafter, at negative total taking operations mechanism controlled by the totalizer is rendered effective to permit two cycles of movement, that is, two complete rotations of the driving shafts 21 and 24.

*Keyboard and differential mechanism.*

Figure 1:
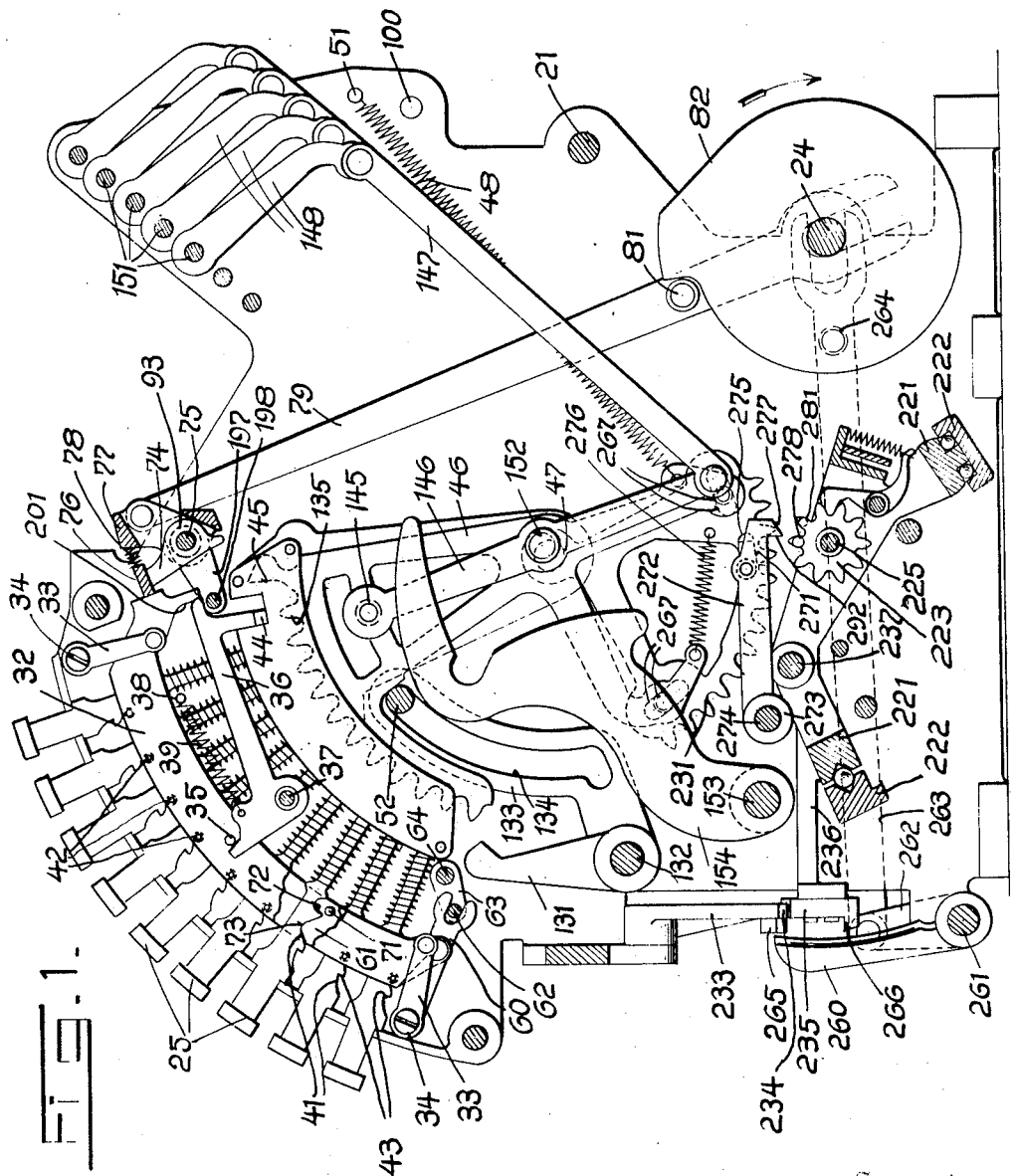
Figure 1 is a section taken at the right of one of the amount key banks of the improved machine.

The keyboard in this particular instance comprises six banks of value keys 25 (one of which banks is shown in Fig. 1) a special key bank containing a total key 26, a credit key 27, and a debit key 28 (Fig. 2), and a lever 31 (Figs. 3, 4 and 5) which is manually adjustable to either of two positions, depending upon whether an item is to be entered or whether the totalizer is to be cleared and the total printed.

The value keys 25 control the differential mechanism for operating the totalizer, these keys being depressible in the usual way against the tension of springs surrounding the shanks of the keys. At the right side of each bank of value keys is a plate 32 (Fig. 1) supported by links 33 pivoted as at 34 to the machine frame. Fast to the plate 32 is a pin 35 engaging a zero stop 36 pivoted on a stud 37 attached to the adjacent right hand machine frame. Said stop and the plate 32 are normally held in the positions shown by a spring 39 stretched between the forwardly projecting arm of the zero stop and a fixed pin 38. Each of the keys has an inclined edge 41 which, as the key is depressed, engages one of a series of pins 42 attached to the plate 32 thereby forcing the plate down against the tension of the spring 39. After the inclined portion 41 has passed the pin 42 the plate is slightly raised by the spring 39, thereby engaging the pin 42 with a notch 43 in the depressed key. This serves to lock the key in depressed position until it has performed its function, after which the key is released as hereinafter described. When no key has been depressed in a bank the zero stop 36 rests in the position shown where a laterally extending lug 44 will be in the path of an extension 45 on a differential member 46 associated with each bank of keys. When a key is depressed and the plate 32 lowered, as above described, the zero stop is rocked around its pivot 37 to move its projection 44 from the path of the extension 45. The slight partial return toward normal of the plate 32 and zero stop when the key is latched in depressed position does not allow the projection 44 to return far enough to interfere with movement of the differential members 46.

The differential members 46 are pivoted as at 47 (Figs. 1 and 2) to the machine frames. Springs 48 stretched between the lower parts of the differential members and fixed pins 51 tend at all times to rotate the members 46 counter-clockwise about their pivots. The members 46 are, however, held against such movement by an oscillating frame comprising a rod 52 extending through under all of the members and side arms 53 (Fig. 2) pivoted to the machine frames in axial alinement with the differential members 46. Rigid with each of the side-arms is an arm 54 carrying an antifriction roller 55 engaging a slot in the forwardly extending arm of a bell crank 56 loosely mounted on the shaft 21. The other arm of the bell crank carries an anti-friction roller 57 engaging a cam groove 58 in a disk fastened to the driving shaft 24. The arrangement is such that at each operation of the driving shaft the bell crank 56 will be rocked around its pivot first to lower the rod 52 so that the actuating springs 48 may rock the differential members 46 in an anti-clockwise direction and then to restore the rod to its normal position and thereby raise the differential members to the normal position in which they are shown. As will be seen from the drawings, the rod 52 holds the members 46 up out of contact with the zero stops 36 so that each member is permitted to have a single step of movement at each operation regardless of whether or not a key has been operated in a bank. The purpose of this step of movement will appear later. If a key is depressed in a bank, however, the zero stop 36 will have been raised so that as the rod 52 is lowered the differential member 46 will follow until the extension 45 engages the inner end of the depressed key. In item entering the totalizer is then engaged with racks carried by the differential members, after which the rod 52 is restored to normal, picking up the various members at their differentially adjusted positions and carrying them back to the normal starting point. This results in entering in the totalizer the amount represented by the keys depressed.

To lock the value keys against manipulation after the operating mechanism has been started each bank of value keys is provided with a second plate 61 (Fig. 1) at the left side of the keys. At its upper end said plate 61 is supported on a link the same as the link 33 supporting the plate 32 but at its lower end the plate 61 is supported by an arm 60 loosely supported by the same pivot 34 as supports the lower link 33, the arm being slotted at its rear end to engage a rod 62 supported at its ends by arms 63 fast to a rock shaft 64. This shaft is rocked clockwise when any one of the three special keys is depressed, thereby raising the rear end of the arm 60 and lifting the plate 61 to engage pins 71 carried thereby with notches 72 in the keys which have not been depressed and with a notch 73 in the depressed key. This prevents manipulation of any of the value keys until the plate 61 is restored to normal by release of the special key. The mechanism whereby the shaft 64 is rocked to lock and unlock the value keys will be fully described later on.

At about the time that the operated special key is released and the plate 61 restored to normal position the latching plates 32 for the value keys are all depressed against the tension of the springs 39 thereby disengaging the pins 42 from the notches 43 in the depressed value keys and permitting the key springs to return the value keys to their normal undepressed position. The mechanism for so depressing the plates 32 comprises a yoke having its side arms 74 journaled on a rock shaft 75. The transverse bar 76 of this yoke extends across and is normally lightly in contact with the upper ends of the key latching plates 32. Journaled on the rock shaft 75 is a second yoke with its transverse bar 77 parallel to the bar 76 of the other yoke. Springs 78 are interposed between the two bars to permit movement of the bar 77 independently of the bar 76, this being necessary because in total taking operations, as will appear later, the key latching plates 32 are locked against movement, thereby preventing movement of the bar 76, while the bar 77 is given an invariable movement at each and every rotation of the main driving shaft. This movement of the bar 77 is imparted by a pitman 79 pivoted at its upper end to one of the side arms of the yoke of which the bar 77 forms a part. At its lower end the pitman 79 is slotted to engage and be guided by the driving shaft 24. Attached to the side of the pitman is an anti-friction roller 81 riding on the periphery of a cam 82 fastened to the driving shaft 24. At near the end of a rotation of the driving shaft the cam 82 forces the pitman 79 upward. This, if the latching plates 32 are locked against movement, simply compresses the springs 78 between the yoke bars 76 and 77, but if the plates are free to move the movement of the bar 77 will, on account of the springs 78 being superior to the springs 39, cause the plates 32 to be depressed to release the keys.

The special keys 26, 27 and 28, (Fig. 2) are each depressible against the tension of a spring 83 attached at one end to a pin 206 on the shank of the key and at the other end to the key frame. Each of the keys carries a second laterally extending pin 84. At the right of the special key bank and cooperating with the pins 84 in the keys are two plates 85 and 86 (Figs. 2, 10 and 11) loosely swung on links 87 pivoted as at 88 to the key frame. The plate 86 is provided with an inclined slot 91 for each of the three keys of the bank, the slots being so shaped that complete depression of any key will raise the plate. The function of the plate 86 is to release the machine lock and close the electric circuit through the motor.

At its upper end the plate 86 is provided with a downwardly extending portion in which is a notch 92. Fastened to a sleeve 93 journaled in the machine frame and concentric to the shaft 75 is a curved arm 94 having a laterally extending portion 95 normally in engagement with a shoulder 96 on the plate 86. Fastened to the other end of the sleeve is an arm 97 to which is connected one end of a link 98 slotted at its rear end to receive a stud 101 fastened to an arm 102 attached to a short sleeve 103, journaled in the machine frame and concentric to a shaft 100. To the other end of the sleeve 103 is fastened a locking arm 104 with its end 105 normally in engagement with a cut 106 in the periphery of a disk 107 attached to the side of the gear 22. A spring 108 attached at one end to the pitman 98 and at the other to a pin in the machine frame tends at all times to draw the pitman forward. This forward movement of the pitman is, however, normally prevented by engagement of the lateral projection 95 of the arm 94 with the shoulder 96 on the key operated plate 86. It is clear that when one of the special keys is depressed and the plate 86 raised the notch 92 will be brought opposite the laterally extending portion 95, thereby permitting the spring 108 to draw the link 98 forward and disengage the nose of the locking arm 104 from the cut 106 in the locking disk 107. The driving shafts 21 and 24 are then free to rotate. The sleeve 103 has other connections, not shown, whereby the rocking movement of the sleeve to disengage the locking arm 104 will also effect closing of the motor circuit to drive the machine. Under normal conditions, when the shafts 21 and 24 have completed a rotation, a light spring 1112 breaks the circuit and reëngages the nose 104 of the locking arm with the cut 106 in the locking disk so as to bring the driving mechanism to a stop. The slot at the rear end of the pitman 98 is provided because on negative total taking operations, after the total key is released mechanism controlled by the totalizer holds the locking arm 104 disengaged and the motor circuit closed so as to permit a second cycle of movement of the driving mechanism. When the locking arm 104 is so held out of engagement the release of the total key and return of the plate 86 and arm 94 to their normal positions during the first cycle moves the link 98 rearward so that the stud 101 will be at the forward end of the slot in the pitman. Near the end of the second cycle of movement the means holding the locking arm 104 disengaged is disabled and the spring 1112 is then free to break the electric circuit and stop the driving mechanism in the usual way.

In order to release any special key that may have been depressed, it is necessary to first disengage the projection 95 on the arm 94 from the cut 92 in the plate 86. For this purpose a pitman 111 (Figs. 2 and 2ª) is provided, said pitman being loosely connected at its upper end to an arm 112 rigid with the arm 94 and slotted at its lower end to straddle the driving shaft 24. At near its lower end the pitman is provided with an anti-friction roller 114 to coöperate with a cam 115 fastened to the shaft 24. As shown in Fig. 2ª, in the normal position of the parts, the pitman 111 is held raised with the roller 114 out of contact with the cam. When one of the special keys is depressed and the arm 94 rocked into engagement with the notch 92, the pitman is lowered to bring the roller 114 against the edge of the cam. Just before the rotation of the shaft 24 is completed the portion of the cam having the greatest radius raises the pitman 111, rocking the arm 94 out of engagement and permitting the depressed special key to be returned to normal position by its spring. As the key returns to normal its pin 84 acts against the slot 91 in the plate 86 in such a way as to cam the plate down to the position shown when its projection 96 will be in the path of the shoulder 95 on the arm 94 and latch the arm in its normal ineffective position.

As hereinbefore stated, when any one of the three special keys is depressed the shaft 64 is rocked to operate the locking plates 61 so as to prevent manipulation of the value keys after a special key has been depressed. This rocking movement of the shaft 64 is effected when the arm 94 is rocked to lock the plate 86 in raised position. For this purpose an arm 121, rigid with the shaft 64, has pivoted thereto one end of a link 122. The other end of the link has a slot 123 engaging a stud 124 on the arm 94. When the arm 94 is swung to engage its projection 95 with the notch 92 in the plate 86 the link 122 is forced downward thereby rocking the shaft 64 clockwise and raising the locking plates 61 to engage the pins 71 thereon with the notches in the keys.

The function of the plate 85 is to shift the totalizer from the adding position in which it is normally held to the subtracting position. For this reason the plate has, as shown in Figs. 2 and 11, only one inclined slot, this slot being in position to coöperate with the debit or subtracting key 28. When the key in question is depressed the slide is raised thereby operating connections described later to shift the totalizer to subtracting position. When the key is released the totalizer is returned to its normal adding position. In negative total taking operations the plate 85 is raised by the auxiliary mechanism controlled by the totalizer to shift the totalizer to the subtracting position. At this time the total key 26 is in depressed position and in order to permit the necessary movement of the plate 85 it is cut out as shown at 125.

The special key bank is provided with a differential element 46 similar to the ones provided for the value key banks. The only purpose of having a differential element in the special key bank is to control the setting of the special key type carrier. It is not, therefore, provided with the rack above mentioned and hereinafter described more in detail for operating the totalizer.

After the differential members 46 have been swung down until their extensions 45 engage the depressed keys, alining devices are brought into play for temporarily locking the members against movement in either direction. For this purpose an alining arm 131 is provided for each member 46, the arms being fastened to a rock shaft 132. Also fastened to the shaft 132 is a curved arm 133 with a slot 134, which slot in the normal position of the arm is concentric to the pivot points 47 of the members 46. The rod 52 controlling the movement of the actuators passes through the slot 134. This slot is slightly shorter than the arc through which the rod 52 is swung in an operation so that at near the end of its downward movement the rod strikes the bottom of the slot, forcing the lever downward and rocking the alining arms 131 into engagement with alining teeth 135 in the members 46. The bottom of the slot 134 is shaped to permit this movement of the arm and also to maintain the arm in position to lock the differential members against movement until the rod 52 starts to return to its normal or upper position. While the actuators are held locked the type carriers are adjusted as hereinafter described.

The manually adjustable lever 31 is shown in the various figures in its normal or item entering position. In this position it holds totalizer engaging mechanism in the proper position to effect engagement of the totalizer with the actuators during the return of the actuators to normal position. When it is adjusted to its other or total taking position it shifts the totalizer engaging devices to change the time of engagement so that the actuators may drive the totalizer elements back to their zero positions during the movement of the actuators away from their normal position, thereby effecting clearing of the totalizer and differential adjustment of the actuators and type carriers to print the total. It is, of course, desirable to prevent operation of amount keys when the lever is at its total taking position. It is also desirable to prevent operating any but the total key 26 in the special key bank. To accomplish the former result, rigid with the lever 31 is a plate 192 (Figs. 3 and 5) with a depression 193 in which normally rests an anti-friction roller 194 attached to the side of a pitman 195 connected at its upper end to an arm 196 fastened to the rock shaft 75 hereinbefore mentioned and always restrained by a spring 199. Attached to the shaft 75 is a pair of arms 197 (Fig. 1) carrying a rod 198 extending across the value key banks. When the lever 31 is raised to its total taking position the depression 193 will be carried from under the roller 194, thereby rocking the shaft 75 and swinging the rod 198 upward. This upward movement of the rod raises all of the zero stops 36 to permit movement of the differential elements 46 and incidently locks the plates 32 against movement owing to the fact that the rod is brought into the path of extensions 201 of the plates so that the plates are held stationary with the pins 42 in position to prevent depression of value keys. To prevent operation of any but the total key 26 when the lever 31 is in its total taking position, rigid with the lever is a segmental plate 203 (Figs. 2 and 3) having slots 204 and 205 normally in position to coöperate with the pins 206 on the credit key 27 and debit key 28. The edge of the plate 203 will normally prevent depression of a total taking key 26. When the lever 31 is adjusted to its total taking position the segmental plate 203 is rotated clockwise (Fig. 2) thereby carrying the slots 204 and 205 from under their respective keys and bringing the slot 207 in position to permit depression of the total taking key. It is clear from this construction that at the item entering position of the lever 31 the total key cannot be depressed but the debit and credit keys are operable, while at the total taking position of the lever, depression of the credit and debit keys is prevented and operation of the total key only is permitted.

Printing mechanism.

The printing mechanism comprises a type carrier 141 (Fig. 3) for each of the six banks of value keys, a type carrier 142 printing characters to designate the special key used, and a type carrier 143 operated by the manually adjustable lever 31. To the left of the type carriers mentioned is a small type carrier 144, which is normally out of printing position, but is automatically swung to present its type at the printing line in negative total printing operations. As shown in Fig. 13, the six value type carriers print the usual digits to represent amounts, the type carrier 142 prints "T," "Cr." and "Dr." to designate respectively the special keys 26, 27 and 28, while the type carriers 143 prints a "star" at the item entering position of the lever 31 and "T" when the lever is at the total taking position. The small type carrier 144 simply prints a minus or negative sign. The type cariers 141 and 142 are adjusted while the differential members 46 are held in differentially adjusted position by the locking arms 131. The mechanism whereby the adjustment is effected is of a well known type whereby the carriers are adjusted directly from one position to another, that is, without a return to a normal starting point at each operation. For this purpose each of the differential members 46 has pivoted thereto, as at 145 (Fig. 2) a beam 146 loosely connected at its other end to a link 147. The links 147 are loosely connected at their upper ends to arms 148 secured to shafts 151. Attached to the sides of the beams 146 are anti-friction rollers 152. Fastened to a rock shaft 153 is a V-shaped cam 154 for each key bank. Rigid with the shaft 153 is an arm 155, to the upper end of which is pivoted a pitman 156 slotted at its rear end to straddle the driving shaft 24 and carrying an anti-friction roller 157 engaging a cam groove 158 in a disk 159 fastened to the shaft 24. The configuration of the cam groove is such that after the differential members 46 have been differentially adjusted under the control of either the keyboard or the totalizer and locked in adjusted position the pitman 156 is drawn rearward, thereby swinging the cams 154 into engagement with the rollers 152. This rocks the beams 146 about their pivots 145 and through the links 147 effects differential rotation of the shafts 151 from the positions at which they were left at the end of the preceding operation directly to their new positions. The cams 154 are held in engagement for a short time and then are disengaged so as to permit the differential members 46 to return to their starting point without disturbing the setting of the shafts. Toward their left hand ends the shafts 151 have rigidly attached thereto downwardly extending arms 160 connected by links 161 to downwardly extending arms 162 (Fig. 4) of elements 163 loosely mounted upon a shaft 164 journaled in the frames of the machine. At their upper ends the elements 163 are provided with teeth 165 meshing with the teeth of gears 166 attached to sleeves 167, to the opposite ends of which are fastened the type carriers 141 and 142. It is apparent that differential rotation of the shafts 151 as described, will effect corresponding rotation of the type carriers 141 and 142 to present the proper types at the printing line. The type carrier 143 is operated directly by movement of the lever 31 through a link 168 (Figs. 4 and 5) pivoted at one end to the manually adjustable lever 31 and at the other to an upwardly extending arm 170 fast to a sleeve 171 (Figs. 2 and 5) journaled on one of the shafts 151. Fast to said sleeve is an arm similar to the arms 160 provided for the key controlled sections of the machine and connected in the same way by a link 161 to the type carrier operating element 163 provided for the type carrier 143. Movement of the lever 31 will, therefore, result in rotation of the type carrier 143 directly from one position to another. The manner in which the type carrier 144 is adjusted will be described later on.

The printing impression is taken by a platen 172 (Fig. 4) supported by a stud 173 on the side of an arm 174. The hub 175 of the arm is journaled on a stud 178 fastened to the left hand machine frame. Journaled on the stud 178 is also an element 179 having laterally projecting ears 180 and 181 carrying set screws 182 and 183 engaging a stud 184 attached to the side of the platen carrying arm 174. By adjusting the screws 182 and 183, the movement of the arm 174 may be regulated, thereby making it possible to offset wear or lost motion and insure a clear impression.

Pivoted on a stud 189 at the rear end of the element 179 is a pawl 185 provided with a notch 186 engaging a stud 187 on the side of a pitman 188. The stud 189 on which the pawl 185 is pivoted projects laterally through a slot in the upper end of the pitman 188 thereby providing for movement of the pitman independently of the arm 179 and at the same time forming a support for the upper end of the pitman. The pitman is provided with an anti-friction roller 211 engaging a cam groove 212 in a disk 213 fastened to the driving shaft 24. It will be recalled that this shaft normally makes a complete rotation at each operation and the cam groove 212 is so shaped that the pitman 188 is drawn down at the time that the differential adjustment of the type carriers is completed, thereby swinging the platen 172 up to take an impression from the type. The purpose of the pawl 185 will be made clear hereinafter, it being sufficient to state here that in negative total taking operations this pawl is moved to disengage its notch 186 from the stud 187 when the amount on the type carriers is incorrect, that is, the amount which is set up during the first cycle of movement hereinbefore mentioned. This prevents the platen from operating and taking impressions of said incorrect amount. Toward the end of the first cycle of movement the pawl 185 is reëngaged with the stud 187 so that the platen will be operated during the second cycle of movement to print the true negative total set up on the type carriers at the beginning of the second half of the negative total taking operation.

*Totalizer and totalizer operating mechanism.*

The totalizer is carried in two frames, a frame 221 (Fig. 1) carrying the totalizer proper and a rock frame 222, in which the frame 221 is slidably mounted. The totalizer, as shown in Fig. 3, comprises seven pairs of gears, each pair consisting of an adding gear 223 and a subtracting gear 224 all rotatably mounted on a rod 225 supported at its ends in the sliding frame 221. Only six of the pairs of gears are operated directly by the key controlled actuating devices, the seventh pair being operated only by the carrying and borrowing mechanism. Beveled pinions 226 are rotatably mounted on pins in the rod 225, these pinions being constantly in mesh with beveled pinions attached to the sides of the gears 223 and 224 so that rotation of either gear in one direction will cause rotation of its companion gear to the same extent but in the opposite direction. The sliding frame is normally held in its right hand position (Fig. 3) by a spring 227 fastened at its left end to the sliding totalizer frame and at its right end to a pin 228 attached to one of the cross frames of the machine. In this normal position the adding gears 223 are in position to coöperate with actuating racks 231 carried by the differential members 46 for the value key banks.

As stated before, the totalizer may be shifted from its normal or adding position by depression of the debit or subtracting key 28 to raise the plate 85 associated with the special key bank. For this purpose a link 232 (Figs. 2 and 12) loosely connected to the lower end of the plate 85 is pivoted at its other end to a segment 233. This segment is pivoted to one of the cross bars of the machine and has the general form of a bell crank. Its teeth 234 are normally in engagement with the teeth of a rack 235 attached to an arm 236 rigid with the sliding totalizer frame 221. The construction is such that when the debit key 28 is depressed the segment 233 will be swung clockwise (Fig. 12) about its pivot thereby drawing the sliding totalizer frame 221 to the left (Fig. 3) to bring the subtracting gears 224 opposite the actuating racks 221. When the debit key is released the sliding frame 221 is returned to its normal adding position by a spring 227.

In order to engage either the adding gears or the subtracting gears with the actuating racks 231, the rock frame 222 must be rocked anti-clockwise (Fig. 1). The rock frame is fastened to a rock shaft 237 journaled in the machine frames. Attached to the left end of the shaft 237 is an arm 238 (Fig. 5) carrying a stud 241 projecting through a cam slot 242 in a plate 243 pivoted as at 244 to the machine frame. At the end opposite the cam slot the plate 243 carries a stud 245 long enough to be engaged by either an item entering pitman 246 or a resetting pitman 247 (Figs 3 and 5). Both of these pitmen are slotted to receive a long stud 248 carried by an element 251 rotatable about the center 164 and normally connected to the manually adjustable lever 31 by a pawl 252 pivoted to the side of the lever. At their lower ends the pitmen are slotted to engage and be guided by the shaft 24. If the lever 31 is moved from the item entering position in which it is shown the pitmen 246 and 247 will be swung clockwise (Fig. 5) about the shaft 24. This carries a notch 253 in the item entering pitman out of engagement with the stud 245 on the plate 243 and brings the resetting pitman 247 to a position where its lugs 254 will engage the stud 245. The first movement of either pitman is upward thus rocking the plate 243 clockwise about its pivot 244 so that the cam slot 242 will effect clockwise movement of the totalizer rock shaft 237 and raise the totalizer gears into engagement with the actuating racks 231. The second or return movement of the pitman will disengage the totalizer.

The pitmen 246 and 247 are reciprocated in the ordinary way by cams 255 and 256 respectively, fast on the driving shaft 24, the cams being so arranged that the item entering pitman will be reciprocated to engage the totalizer with the actuating racks during the latter part of the operation of the machine, that is, during the time that the differential elements 46 are being returned to their normal starting points. The total taking or resetting pitman 247 is reciprocated so as to hold the totalizer in engagement during the forepart of the operation, or during movement of the differential members 46 away from their normal positions. It is clear, therefore, that this construction provides a means whereby the position of the lever 31 determines the time of engagement and disengagement of the totalizer with the actuating racks, that is, whether the totalizer is to be actuated or cleared at the subsequent operation of the machine. This mechanism has not been described as fully as it might have been because it is substantially the same as the mechanism shown in the applications (now patents) hereinbefore mentioned. In fact, the only material difference is that in the mechanism shown and described in the other applications (now patents) the element carrying the stud 248 is rigid with the lever 31 while in the present application they are connected by means of the pawl 252. The purpose of the pawl is to make it possible to move the element 251 and totalizer engaging pitmen 246 and 247 independently of the lever 31 so that even though the lever 31 is adjusted to total taking position and held at that position the item entering pitman 246 may be rendered effective during part of the operation. This only occurs in total taking where the total is negative. At such an operation the resetting pitman 247 and item entering pitman 246 must both perform their functions in the order named during the first cycle of movement of the driving mechanism while the lever 31 is latched at the total taking position. The mechanism whereby both pitmen are rendered effective during an operation is controlled by the totalizer. Other mechanism also controlled by the totalizer will, after the pitman 247 has performed its function, shift the totalizer from the adding to the subtracting position, after which the pitman 246 will operate to engage the totalizer with the actuators just before the actuators start to return to their normal starting points. In this way the amount cleared from the adding gears is reëntered on the subtracting gears and during this reëntering the transfer devices are operated as before generally described to make the necessary correction for the totalizer to show the true negative total on the adding gears.

When the totalizer rock frame 222 is rocked to engage the totalizer gears with the actuating racks 231, the teeth of the rack 235 are of course disengaged from the teeth of the totalizer frame adjusting segment 233. In order to hold the totalizer in proper alinement while disengaged there is provided a curved blade 260 (Fig. 1) fastened to a rock shaft 261. Rigid on this shaft is an upwardly extending arm 262 to which is fastened one end of a pitman 263. At its other end the pitman is slotted to engage the driving shaft 24. An anti-friction roller 264 on the pitman coöperates with a cam, not shown, attached to the shaft 24. This cam is of the ordinary box type and is so arranged that the alining blade 260 is at the beginning of an operation swung rearward into engagement with the alining teeth 265 (Figs. 1 and 12) on the totalizer adjusting segment 233 and with alining teeth 266 on the rack 235. The blade is held in engagement during movement of the differential members 46 away from their normal position after which the blade is disengaged and held out of engagement for a brief period. It is then reëngaged with the alining teeth 265 and 266 and maintained in engagement until the differential members 46 are fully restored to their starting point. As shown, the curved edge of the blade 260 is long enough to remain in engagement with both the teeth 265 and the teeth 266 while the totalizer frame 222 is being rocked. The object of disengaging the alining blade between the two movements of the differential members is to permit the totalizer to be shifted from the adding to the subtracting position during a negative total taking operation.

The totalizer actuating racks 231 are loosely mounted on the same pivots 47 as the differential members 46 and have slot and pin connections 267 (Fig. 1) with downwardly extending portions of the differential members, the slots being long enough to permit a step of relative movement between the actuating racks 231 and the differential members 46. This relative movement is to enable the actuators to perform carrying operations. Arms 271 (Fig. 1) are normally in position to engage studs 275 on the racks 231 when the differential members 46 are restored to normal, thereby holding the racks stationary against the tension of springs 276 during the final step of movement of the differential members. The arms 271 are fastened to short sleeves 273 journaled on a rod 274 extending across the machine above the totalizer frames. Attached to the other end of each sleeve is an arm 272 coöperating with the next lower order denominational pair of totalizer elements. Each arm 272 has a beveled portion 277 to be engaged by tripping pins 278 on the adding gears or tripping pins 281 on the subtracting gears. The pins 278 on the adding gears are so positioned that they will as the gears pass from "9" to "0" engage the beveled portions 277 and raise the arms 271 out of the path of the studs 275 thereby permitting the racks 231 to move the additional step and turn the next higher order elements one division. The pin in the subtracting elements operates the arms 271 and 272 in the same way when the subtracting elements are in engagement with the racks except that the pins in the subtracting elements are positioned to operate the arms as the subtracting elements are advanced from "0" to "1." At this time the adding elements are, of course, being reversely rotated from "0" to "9."

As hereinbefore stated, the rod 52 holds the differential members 46 up far enough out of contact with the zero stops 36 for each actuator to have a single step of movement regardless of whether or not a key has been operated in the bank. This is to permit restoring any of the pairs of arms 271 and 272 that may have been tripped during an operation. To accomplish this, just before the driving mechanism completes a cycle of movement a portion 291 (Fig. 2) of the cam groove 57 operating the rod 52 lowers the rod slightly and the springs 48 and 276 thereupon swing the actuating members 46 and racks 231 far enough to the rear for the arms 271 to drop in front of the studs 275 so that when the rod 52 is raised to restore the differential members 46 to their original position the racks 231 will be held stationary against the tension of the springs 276.

In total taking operations, the adding elements of the totalizer are engaged with the actuating racks 231 before the rod 52 is lowered so that as the rod is carried down the whole distance to permit the springs 48 to drive the racks the adding elements will be reversely rotated until they are stopped by their pins 278 engaging the squared sides 292 of the shoulders on the transfer arms 272. After the totalizer has been cleared and the actuators adjusted in this way, the locking pawls 131 are thrown into engagement and the cams 154 operated to adjust the type carriers. If the totalizer was in a positive condition at the beginning of the total taking operation the impression is at once taken, but if the totalizer was in a negative condition the mechanism has two cycles of movement instead of one at each of which the amount is set up on the type carriers. However, the amount set up at the first cycle of movement is incorrect and the pawl 185 is operated to disconnect the platen from the driving mechanism during this first cycle of movement so that no impression will be taken on the first or incorrect amount on the type carriers. At near the end of the first cycle of movement the pawl 185 is restored to normal position so that the platen will be reconnected to the driving mechanism and operated to take an impression in the usual way during the second cycle of movement. During this second cycle of movement and preliminary to the operation of the platen the type carriers will be adjusted under the control of the adding elements to print the correct negative total. It is clear that the construction and operation of the totalizer and totalizer operating devices are such that positive and negative items may be entered indiscriminately. If during the entering of a series of items the total of the elements entered on the subtracting elements is less than the total of the items entered on the adding elements the result will be that the actuations of the subtracting elements will simply reversely rotate the adding elements to a position where they will correctly represent the difference or remainder. If the total of the items entered on the adding elements and on the subtracting elements is the same at the end of the entries actuations of one set of elements will have off-set the results of the actuation of the other elements and the totalizer will be at zero. If, however, at any time, the entries on the subtracting elements run in excess of the entries on the adding elements the subtracting elements will not only be advanced far enough to off-set the reverse rotations previously imparted to them through the intermediate pinions 226 when the adding elements were actuated but they will be driven forward through "0" and "1" and as they pass "0" they will trip the carrying devices so that after the totalizer as a whole has passed through zero in this negative direction all the carrying devices above the lowest order driven element will have been tripped. As a result all of the higher subtracting elements will be advanced one division and the adding elements reversely rotated to the same extent. The totalizer will then be set incorrectly to represent the negative result each of the subtracting elements except the lowest driven element having been turned one division too far, while the connected adding elements will be one step short of the positions they should occupy to represent correctly the complement of the correct negative result. If when the totalizer is in this negative condition subsequent actuations of the adding elements advance the adding elements far enough to off-set the reverse rotations imparted to them through the subtracting elements and intermediate pinions, the adding elements will, as they are driven from "9" to "0," again operate the carrying devices from the lowest driven adding element all the way across to the highest element of the totalizer and thereby restore the totalizer to correctly set positive condition. It is apparent, therefore, that each time the totalizer passes through zero in either the positive or negative direction the carrying devices will effect movement of all the higher order totalizer elements. This movement of the higher elements controls the auxiliary mechanism called into play in total printing operations when the total to be printed is negative.

Auxiliary mechanism controlled by the totalizer.

The auxilary mechanism mentioned comprises three cam disks 301, 302 and 303 (Figs. 3, 6, 7 and 8) rigid on the shaft 100. Attached to the shaft 100 is a gear 305 (Fig. 3) meshing with a gear 306 loose on the driving shaft 21. Fast to the side of the gear 306 is a smaller gear 307. Adjacent the gear 307 and fastened to the shaft 21 is a gear 308 having the same diameter and general arrangement of its teeth as the gear 307. In negative total taking operations a broad toothed pinion 309 is thrown into engagment with gears 307 and 308 so that movement of the driving shaft 21 will be transmitted to the cam shaft 100. The gears 305 and 306 are so proportioned with reference one to the other that two rotations of the shaft 21 are required to effect a single rotation of the shaft 100.

The broad toothed pinion 309 is rotatably mounted on a stud 310 attached to the side of an arm 311 at near the upper end of the arm. At is lower end the arm 311 is fastened to one end of a short shaft 312 journaled in the lower end of a link 313 pivoted at its upper end on the shaft 100. Fastened to the other end of the shaft 312 is an arm 314 (Figs. 3 and 5) carrying at its upper end an anti-friction roller 315 projecting into a cam slot 316 in an arm 317 rigid with the lever 31. If the parts just mentioned are all in the positions shown in the drawings and the lever 31 is adjusted to its upper or total taking position the cam slot 316 in the arm 317 will carry the arm 314 forward and downward and the link 313 under the action of spring 330, to be described will swing about the shaft 100 thereby preventing the arm 311 from being swung forward to engage the broad toothed pinion 309 with the gears 307 and 308. This is the operation of the parts when the totalizer is in a positive condition. When, however, the totalizer passes from a positive to a negative condition and the transfer devices are tripped all the way across the totalizer by the pins in the subtracting gears, devices are operated for holding the shaft 312 stationary when the lever 31 is adjusted, causing the arms 311 and 314 to operate as a bell crank and engages the broad tooth pinion 309 with the gears 307 and 308. To accomplish this the highest order adding gear has all but one of its teeth shortened, as best shown in Fig. 4. Coöperating with this adding gear is an arm 318 having a finger 319 (Fig. 3) extending laterally under the gear, the finger being long enough to coöperate with the gear regardless of whether the totalizer is in the adding or subtracting position. All the teeth on the highest order subtracting gear are shortened so that while they are long enough for the actuating racks 231 to operate the gear in effecting transfers, they cannot affect the finger 319 when the totalizer is in the subtracting position. The arm 318 is fastened to a shaft 321 journaled in the machine frames. Fastened to the same shaft is an arm 322 loosely connected to a lever 323 pivoted on the driving shaft 24 and having a notch 324 to engage the end of the shaft 312. A spring 325 normally holds the rear end of the lever 323 down and the arm 318 up in contact with the adding gear. When the highest order subtracting element is advanced a step from zero and the connected adding gear is reversely rotated to the same extent by the carrying mechanism as hereinbefore described, the long tooth of the highest order adding gear is moved counter-clockwise (Fig. 4) so that the long tooth will pass above and rest against the upper surface of the finger 319. As the long tooth passes above the finger 319 the arm 318 will be forced down and held down as long as the totalizer is in a negative condition. This downward movement of the arm 318 rocks the lever 323 so that its notch 324 will be in engagement with the shaft 312 and hold the shaft and its supporting link 313 stationary, so that the shaft and notch 324 will coöperate to serve as a pivot for the bell crank formed by the arms 311 and 314, and adjustment of the lever 31 will then throw the broad toothed pinion 309 into engagement with the gears 307 and 308 against the tension of spring 330 thereby connecting the cam shaft 100 to the driving mechanism.

In order to hold the gear 307 and connected mechanism in proper alinement when the broad toothed pinion is out of engagement, there is provided an alining element 326 (Figs. 3, 4 and 6) pivoted at one end on the stud 310 supporting the broad toothed pinion, this element having a slot 327 surrounding the shaft 21. At its forward end the alining element is provided with a laterally extending portion 328 (Fig. 3) having a couple of teeth to engage the teeth of the gear 307. A spring 330 (Fig. 6) stretched between the forward end of the alining element and a fixed pin 331 normally holds the broad toothed pinion 309 out of engagement with gears 307 and 308 and the teeth of the alining element in engagement with the gear 307. As the broad toothed pinion is swung into engagement by movement of the lever 31 under the action of arm 314 and against the tension of spring 330 the alining element is moved forward to disengage its teeth and leave the gear 307 free to rotate and as the broad toothed pinion is withdrawn the alining teeth are moved back into engagement, the arrangement being such that the proper relation of the auxiliary shaft 100 and the parts attached thereto with the main operating mechanism is properly maintained.

It is apparent, of course, that as soon as the long tooth of the adding gear is carried out of engagement with the finger 319, a thing which occurs when the adding elements are reset at the beginning of an operation, the spring 325 would immediately draw the notch 324 out of engagement with the shaft 312 and the spring 330 would then, if no means were provided for preventing it, immediately swing the broad toothed pinion 309 out of engagement with gears 307 and 308. As a result the cam shaft 100 would be driven only part of a rotation. Such a condition would, of course, be wholly unsatisfactory. In order to hold the broad toothed pinion in engagement until the shaft 100 has completed its full rotation there is provided an alining arm 332 (Fig. 4) fast to a short sleeve 333 (Fig. 3) surrounding the driving shaft 24. Fastened to the other end of this sleeve is an arm 334 to which is connected the lower end of a pitman 335. At its upper end the pitman is slotted to engage and be guided by the shaft 100 and carries an anti-friction roller 336 (Fig. 7) projecting into a cam slot 337 in the right hand side (Fig. 3) of the cam disk 302. As shown in Fig. 7, the groove 337 is so formed that immediately after the shaft 100 starts to rotate the pitman 335 is drawn upward, swinging the locking arm 332 into engagement with a notch 338 in the lower end of an extension 341 of the link 313. The locking arm is held firmly in engagement until the rotation of the shaft 100 is completed.

In addition to locking the broad toothed pinion 309 in engagement with the gears 307 and 308 the cams on the shaft 100 operate the pawl 185 to connect and disconnect the platen arm 179 and the pitman 188, shift the totalizer from the adding to the subtracting position, set the type carrier 144 to print a designation for negative totals, operate the pawl 252 to connect and disconnect the element 251 and the lever 31, hold the locking arm 104 (Fig. 2) out of engagement with the notch 106 until the driving mechanism has completed two cycles of movement, and move the element 251 after the resetting pitman 247 has performed its function so as to disable that pitman and render the item entering pitman 246 effective to engage the subtracting elements with the actuators during the item entering movement of the actuators.

The pawl 185 is operated by a pitman 343 (Figs. 3, 4 and 6) pivoted to the pawl. This pitman is in the form of a yoke spanning the cam disk 301 and having its side arms slotted to surround the shaft 100. The right arm (Fig. 3) of the yoke carries a roller 344 (Fig. 6) projecting into a cam groove 345 in the side of the cam disk 301. The configuration of the cam groove is such that the pitman is thrust forward shortly after the shaft 100 begins to turn, thereby unhooking the pawl 185 from the stud 187 and holding it unhooked during approximately the first one-half of the rotation of the shaft 100 or the first of the two rotations of the driving shaft 21, after which the pawl is reëngaged so that the platen 172 will be operated during the second rotation of the shaft 21.

All of the other functions of the cams on the shaft 100 are performed through three yokes 347, 348 and 349 (Figs. 3, 4 and 9) journaled respectively on the first, second, and third shafts 151 counting from the top. These three shafts are extended all the way across the machine so as to form suitable supports for the left hand elements of the yokes. The yoke 349 forms a part of the mechanism for automatically shifting the totalizer during a negative total taking operation. For this purpose a pitman 351 (Figs. 3, 4, 6 and 9) is pivoted at its upper end to an extension of the left side arm of the yoke 349, the pitman carrying an anti-friction roller 352 projecting into a cam groove 353 formed in the left hand side (Fig. 3) of the disk 301. The right hand side arm of the yoke 349 is connected by a link 354 (Fig. 2) to the upper end of the plate 85 associated with the special bank. This plate 85, it will be remembered, is raised when the debit or subtracting key 28 is depressed and acts through the link 232 and segment 233 to shift the totalizer from the adding to the subtracting position. The shape of the cam groove 353 is such that when the shaft 100 has been turned about one-fourth of a rotation and the driving shaft 21 one-half of a rotation, during which time the actuating racks will have reset the totalizer, the pitman 351 is given an upward thrust. This rocks the yoke 349 counter-clockwise, Figs. 4 and 6, or clockwise as viewed in Fig. 2, drawing the plate 85 upward and sliding the totalizer to the subtracting position. The parts are held in this position until the shaft 100 has completed the first half of its rotation and the shaft 21 its first complete rotation by which time the subtracting elements will have been engaged with the actuators 231 and actuated and the totalizer disengaged. The pitman 351 is then drawn downward to its original position permitting the spring 227 to restore the totalizer to its normal adding position.

As shown in Fig. 2 the link 354 has a slot and pin connection with the side arm of the yoke 349 the purpose of this connection being to permit upward movement of the plate 85 when the debit key 29 is depressed in item entering operations during which operations the yoke 349 is, of course, held stationary.

The movement of the yoke 348 performs three of the functions above mentioned, that is, it swings the negative total type carrier 144 to present its type at the printing line, it operates the pawl 252 at the proper points in an operation to first disconnect and then re-connect the lever 31 and element 251, and it prevents the machine locking arm 104 from reëngaging the notch in the locking disk 107 until the driving shaft 21 has made two complete rotations. The connections whereby these results are obtained will next be described in the order mentioned.

Rigid with the left side arm of the yoke 348 is a sleeve 355 (Figs. 3, 4 and 9) concentric to the shaft 151 on which the yoke is pivoted. To the left end of this sleeve is fastened an arm 356 connected by a link 357 to an arm 358. The arm 358 and type carrier 144 are attached to the opposite ends of a short sleeve 361 (Fig. 3) loose on the shaft supporting all of the type carriers. The right hand side arm (Figs. 3 and 9) of the yoke 348 is formed with an extension 362 (Fig. 5) connected by a link 363 to an element 364 loosely mounted upon the sleeve connecting the arm 317 and the lever 31. This element is provided with a cam slot 365 engaging a roller 366 on the side of the pawl 252. It should be stated here that when the lever 31 is adjusted from its item entering position to its upper or total taking position the pawl 252 is carried along until the roller 366 reaches a point adjacent the eccentric or cam portion 367 of the slot so that if the element 364 is then moved clockwise (Fig. 5) the cam portion of the slot will depress the rear end of the pawl 252 and disengage the nose of the pawl from the notch in the element 251. Also rigid with the right hand side arm of the yoke 348 and concentric to the shaft 151 supporting the yoke is a sleeve 368 (Figs. 2, 3 and 5) extending through the adjacent machine frame. Fastened to the right end of the sleeve 368 is an arm 369 (Fig. 2). Pivoted to this arm is one end of a link 370 having a slot and pin connection at its lower end with an arm 371 rigid with the locking arm 104. The yoke 348 is operated by a pitman 372 (Figs. 3, 4, 6, 7 and 9) pivoted to an extension 373 of the left side arm of the yoke and actuated by a cam groove 374 (see Fig. 7) in the side of the cam disk 302. As shown in Fig. 7 the cam groove 374 is of such shape that the pitman 372 is drawn down almost immediately after the shaft 100 begins to turn and is held down until the shaft has made about three-fourths of a rotation or during approximately one and one-half cycles of movement of the driving mechanism. The first or downward movement 372 rocks the yoke 348 counter-clockwise (Fig. 4) and this through the link connection 357 rocks the type carrier 144 anticlockwise to bring its type in position to coöperate with the platen 172. The link 363 (Fig. 5) is at the same time thrust forward to bring the cam portion 367 of the slot 365 in engagement with the roller 366 to disengage the pawl 252 from the element 251, and the link 370 (Fig. 2) is thrust downward to hold the locking arm 104 out of engagement with the locking disk 107.

Operation of the yoke 347 shifts the element 251 after the pawl 252 has been operated to disconnect the element from the lever 31. This movement of the element 251 shifts the counter engaging pitmen 246 and 247 so that after the resetting pitman 247 has performed its function, it will be disengaged and the item entering pitman 246 engaged with the stud 245 to mesh the subtracting elements with the actuators during the item entering movement of the latter, the subtractive elements having in the meantime been brought opposite the actuators. For this purpose an upwardly extending portion 375 (Figs. 5 and 9) formed on the right hand side arm of the yoke 347 is loosely connected by a link 376 to the element 251. The yoke 347 is operated by a pitman 377 pivoted to a forwardly extending arm 378 (Fig. 6) formed on the left side arm of the yoke. At near its lower end the pitman is provided with the usual anti-friction roller 381 (Fig. 8). This roller when the lever 31 is at its normal or item entering position is held in engagement with a cut 382 opening into a cam groove 383. When the lever is moved from its lower to its upper position the element 251 will, on account of the connection formed by the pawl 252, draw the link 376 downward and forward so as to rock the yoke 347 clockwise (Figs. 5 and 6). This will thrust the pitman 377 down far enough to disengage the roller 381 from the cut 382 and hold it in proper position to coöperate with the cam groove 383 when the cam is rotated. As shown in Fig. 8, the cam groove 383 is so shaped that the pitman 377 is thrust upward at the beginning of the second quarter of the revolution of the shaft 100 and held raised until near the completion of the first half of the rotation. During this time the actuators are being restored to their normal position to effect actuation of the subtracting elements. When at the completion of the negative total taking operation the lever 31 is adjusted to normal position ready to begin the entry of a new series of items the pitman 377 will, of course, be raised and the roller 381 reëngaged with the cut 382 to lock the shaft against rotation. This construction, therefore, provides a means auxiliary to the alining element 326 for locking the cam shaft 100 in proper position when it is disconnected from the driving mechanism.

*Operation.*

To operate the machine the proper keys to represent the amount of the item are first depressed and then either the credit key 27 or the debit key 28 depending upon whether the amount is to be added or subtracted. The totalizer is normally in a position for its adding gears 223 to coöperate with the actuator racks 231, but when the debit or subtracting key is depressed, the totalizer is shifted to bring the subtracting gears 224 in position for operation. When the totalizer is clear or at zero, the zero positions of the adding and subtracting elements are in horizontal alinement, and, as the elements of each denominational pair are geared together for relative movement, differential operation of either the adding or subtracting elements to enter an amount will effect reverse rotation of the elements of the other set to the same differential extents. This provides a construction whereby a negative amount may be subtracted from a larger positive amount appearing on the adding wheels by simply actuating the subtracting elements to turn the adding wheels back the proper distance. The positive remainder may at any time be cleared from the adding wheels and set up on the type carriers to be printed in the ordinary way by first adjusting the lever 31 to the total taking position and then depressing the total key to release the machine lock and close the circuit through the driving motor.

The single set of carrying devices is operated by either the adding or subtracting elements which ever happen to be in engagement. The pins 278 in the adding elements trip the carrying devices as the elements are advanced from "9" to "0," but the pins 281 in the subtracting elements trip the carrying devices as they pass from "0" to "1" or while the adding elements are being reversely rotated from "9" to "0." It is clear that when the amounts entered on a subtracting element exceed the capacity of the element a transfer will be made to the next highest order subtracting element. This step of transfer movement of the higher order subtracting elements reversely rotates the adding elements a step so that one is borrowed or deducted from the adding element.

Owing to the position of the tripping pins in the subtracting elements, it is apparent that when the totalizer is at zero all of the subtracting elements will be at their transferring positions and the first subtracting element advanced from "0" to "1" by the actuators will effect operation of the higher order transfer devices all the way across the totalizer. For example if the totalizer is at zero and 1¢ is entered on the subtracting side of the totalizer, as the units subtracting element passes from "0" to "1" it will operate the transfer mechanism to turn the tens wheel from "0" to "1," and this is repeated all the way across the totalizer so that at the end of the operation the subtracting elements will show 11,111.11 and the adding elements will all have been reversely rotated a step so that they will show 99,999.99. If now 1¢ be entered on the units adding element, as the element advances from "9" to "0" it will operate the transfer to turn the next higher order adding element from "9" to "0" and this will be repeated all the way across the totalizer so that at the end of the operation the totalizer will be at zero. This illustrates just what occurs when the totalizer passes through zero in either direction during the entry of a series of items, that is, if the totalizer is in either a positive or negative condition as it passes to the opposite condition or other side of zero the higher order adding and subtracting elements are all turned one division but in opposite directions. This movement of the highest order adding element controls the correction of the totalizer.

The correction is necessary because of the negative "0" to "1" transfer or borrowing operation of the carrying mechanism. For instance, when the totalizer was at zero and 1¢ then entered on the units subtracting element the subtracting elements were all turned one division to 11,111.11 and the adding elements set at 99,999.99. The correct setting would, of course, have been 00,000.01 for the subtracting elements and 00,000.09 for the adding elements. In all cases when the totalizer has passed to a negative condition each of the higher order elements to the left of the lowest significant figure will have been turned one step too far. In order to correct the totalizer and incidentally place the correct amount of the negative total upon the adding wheels, which alone control the type carriers, the totalizer is first cleared with the adding elements in engagement thereby setting up on the actuators the amount taken from the adding wheels, in the above example, 99,999.99. The actuators are then temporarily locked in adjusted position while the adding elements are rocked out of engagement and the totalizer shifted laterally and then rocked to engage its subtracting elements with the actuators. While the actuators are held the amount 99,999.99 is also set up on the type carriers, but as such an amount would have no meaning if printed the pawl 185 (Fig. 6) is operated to disconnect the platen carrying arm from its operating pitman 188. After the subtracting elements are engaged with the actuators the actuators are restored to their original starting point thereby advancing each subtracting element from "0" to "9." In addition to this, each subtracting element, as it travels from "0" to "1" at the beginning of this movement, will operate the transfer devices thereby advancing the higher order subtracting wheels an additional step or a total of ten steps, so that at the end of the operation the subtracting elements will show 00,000.09 and the adding elements 00,000.01, the latter, of course, being the correct negative amount. The totalizer is then automatically returned to its adding position after which it is again cleared with the adding elements in engagement and the type carriers adjusted accordingly as before stated. The amount on the type carriers should now be printed and the impression platen will by this time have been restored to its normal operative condition so that the impression will be taken. The mechanism for permitting the driving mechanism to have two cycles of movement instead of one, for disabling the platen, for shifting the totalizer, for engaging the adding wheels during movement of the actuators in one direction and the subtracting elements during movement in the opposite direction and for setting the negative total type carrier is all controlled by the condition of the totalizer and operated by cam grooves in the disks 301, 302 and 303 fastened to the shaft 100. The connections operated by these cams have all been explained in detail and as an incident to the explanation, the operation was covered as thoroughly as is thought necessary. This part of the operation need not, it is believed, be repeated here.

The driving connection between the shaft 100 and the main driving shaft 21 is established by the broad pinion 309 when the lever 31 is adjusted to total taking position, providing the totalizer is at the time in a negative condition. When the totalizer passes to such a condition the highest order adding element is rotated a division counter-clockwise from the position in which it is shown in Fig. 4 by the operation of the "0" to "1" transfers. This movement of the highest order adding element causes its long tooth to depress the rear end of the lever 318 and swing the notch 324 into engagement with the floating shaft 312, so that when the lever 31 is adjusted to total taking position the shaft will then serve as a fulcrum for the bell crank formed by the arms 311 and 314. Then when the arm 314 is drawn forward by the cam slot 316 in the arm 317 rigid with the lever 31, the broad pinion 309 will be swung into engagement with the coöperating gears to establish the driving connection; but if the totalizer is in a positive condition the long tooth on the highest order adding element will, of course, be in ineffective position and the notch 324 will be out of engagement with the floating shaft 312. Then the movement of the lever 31 will not swing the broad pinion into engagement with the mechanism on the shaft 100 will not be called into play, but the totalizer will simply be cleared and the positive total printed in the ordinary way.

While the form of mechanism herein shown and described is admirably adapted to fulfil the objects primarily stated, it is to be understood that it is not intended to confine the invention to the one form of embodiment herein disclosed for it is susceptible of embodiment in various forms all coming within the scope of the claims which follow.

What is claimed is:—

1. In a machine of the class described, the combination with a totalizer constructed to pass back and forth through and operate at either side of zero, of totalizer operating mechanism so constructed as to set the totalizer incorrectly to represent the result of operations as the totalizer passes in one direction from zero, and correcting mechanism whereby when incorrectly set the totalizer may first be cleared and then set correctly to represent said result at an operation of the operating mechanism.

2. In a machine of the class described, the combination with a totalizer constructed to pass back and forth through and operate at either side of zero, of totalizer operating mechanism so constructed as to set the totalizer incorrectly to represent the result of operations when the result is negative, and correcting mechanism rendered effective when the totalizer passes to a negative condition whereby the totalizer may first be cleared and then set correctly to represent the negative result at an operation of the operating mechanism.

3. In a machine of the class described, the combination with a totalizer constructed to pass back and forth through and operate at either the positive or the negative side of zero, of totalizer operating mechanism so constructed as to set the totalizer incorrectly to represent the result of operations when the result is negative, and correcting mechanism controlled by the totalizer whereby the totalizer may first be cleared and then set correctly to represent the negative result at an operation of the operating mechanism.

4. In a machine of the class described, the combination with a totalizer constructed to pass through and operate at either side of zero, of totalizer operating mechanism so constructed as to set the totalizer incorrectly to represent the result of operations as the totalizer passes in one direction from zero, total taking mechanism, and correcting mechanism whereby when incorrectly set the totalizer will first be cleared and then set correctly to represent said result at operation of the total taking mechanism.

5. In a machine of the class described, the combination with a totalizer constructed to operate back and forth through and at either the positive or the negative side of zero, of item entering mechanism, carrying mechanism operating the higher order totalizer elements as the totalizer passes in either direction through zero, operation of the carrying mechanism in one direction effecting incorrect setting of the totalizer, normally ineffective totalizer correcting mechanism controlled by the totalizer, and a lever operable to render the correcting mechanism effective.

6. In a machine of the class described, the combination with a totalizer constructed to operate back and forth through and at either the positive or the negative side of zero, of item entering mechanism, carrying mechanism operating the higher order totalizer elements as the totalizer passes in either direction through zero, operation of the carrying mechanism in one direction effecting incorrect setting of the totalizer, normally ineffective totalizer correcting mechanism controlled by the totalizer, and manipulative devices operable to render the correcting mechanism effective.

7. In a machine of the class described, the combination with a totalizer susceptible to positive and negative entries and constructed to operate back and forth through and at either the positive or the negative side of zero, of item entering mechanism, carrying mechanism constructed to move the highest order element of the totalizer as the totalizer is driven in either direction through zero by the item entering mechanism, operation of the carrying mechanism in the negative direction causing the totalizer to be set incorrectly to represent the negative amount, and mechanism controlled by the highest order totalizer element for automatically clearing the totalizer and then entering the correct negative total therein.

8. In a machine of the class described, the combination with a totalizer susceptible to positive and negative entries and constructed to operate back and forth through and at either the positive or the negative side of zero, of mechanism for entering positive or negative items in the totalizer, carrying devices so constructed that when the totalizer passes through zero in either direction the highest order denominational unit of the totalizer will be moved, operations of said devices in the negative direction setting the totalizer incorrectly to represent the negative amount, and mechanism controlled by the highest order denominational unit whereby the totalizer when incorrectly set may first be cleared and the correct negative amount then entered thereon.

9. In a machine of the class described, the combination with an adding and substracting totalizer, of operating devices therefor, the construction and operation of said devices being such that when the subtractions have exceeded the additions the totalizer will be incorrectly set, and means effective when the totalizer is incorrectly set whereby the totalizer may first be cleared and then set to show correctly the amount of the excess.

10. In a machine of the class described, the combination with a totalizer comprising adding and subtracting elements, of operating mechanism therefor, said mechanism being so constructed that when the subtractions have exceeded the additions the totalizer will be incorrectly set, and means effective when the totalizer is incorrectly set whereby the totalizer may be automatically cleared and then set to show correctly the amount of the excess.

11. In a machine of the class described, the combination with totalizer operating mechanism, of an adding and subtracting totalizer comprising a set of elements rotated in one direction in adding and in the opposite direction in subtracting, and correcting mechanism effective when the subtractions have exceeded the additions and operable to first clear said elements and then enter the amount of the excess thereon.

12. In a machine of the class described, the combination with totalizer operating mechanism, of an adding and substracting totalizer comprising a set of elements rotated in one direction in adding and in the opposite direction in subtracting, and correcting mechanism controlled by said elements whereby when the subtractions have exceeded the additions the elements may be cleared and the amount of the excess entered thereon.

13. In a machine of the class described, the combination with a totalizer comprising adding and subtracting elements connected for relative movement, of means for entering additions on subtractions in the totalizer the construction and operation of said means being such that the adding elements will show the true positive balance when the additions have exceeded the subtractions but neither the adding nor the subtracting elements showing the true negative total when the subtractions have exceeded the additions, and means controlled by the totalizer for automatically clearing the totalizer and then setting it for one set of elements to show the true negative total.

14. In a machine of the class described, the combination with a totalizer comprising adding and subtracting elements bearing a complemental relation one to the other and geared together for relative movement, of a single set of actuating and carrying devices, total taking devices, means controlled by the total taking devices, and the totalizer for resetting the totalizer by engaging the adding elements with the actuators during movement of the latter in one direction and actuating said elements by engaging the subtracting elements with the actuators during movement of the actuators in the opposite direction, and transfer projections carried by the subtracting elements and positioned to trip the carrying devices as said elements pass from 0 to 1.

15. In a machine of the class described, the combination with a totalizer comprising adding and subtracting elements bearing a complemental relation one to the other and geared together for relative movement, of a set of oscillatory actuators having a normal starting point, means for engaging either the adding or subtracting elements with the actuators during movement of the latter in one direction whereby to enter items, means for clearing the totalizer by engaging the adding elements with the actuators during movement of the latter in the other direction whereby to differentially adjust the actuators, means for locking the actuators in differentially adjusted position, means for disengaging the adding elements from the actuators while the actuators are locked and engaging the subtracting elements with the actuators, means for then restoring the actuators to normal, and transfer devices operated as the substracting elements pass from 0 to 1.

16. In a machine of the class described, the combination with a totalizer comprising adding elements and substracting elements, of actuators, means for establishing operative relationship between the actuators and either the adding or the subtracting elements, carrying devices, projections on the adding elements arranged to trip the carrying devices as the adding elements pass from 9 to 0, projections on the subtracting elements arranged to trip the carrying devices as said elements pass from 0 to 1, said projections being effective only when their respective elements are in operative relationship with the actuators, means for clearing the totalizer and setting up on the actuators the amount taken from the adding elements, means for then engaging the subtracting elements with the actuators, and means for then restoring the actuators whereby to effect actuation of the subtracting elements and operation of the carrying devices.

17. In a machine of the class described, the combination with a set of actuators, of a plurality of groups of totalizer elements, a support for the elements movable transversely of the actuators whereby to establish operative relationship between a desired group and the actuators, and means controlled by one set of elements for effecting movement of the totalizer support during an operation.

18. In a machine of the class described, the combination with a totalizer actuating and clearing mechanism, of a plurality of sets of totalizer elements, a movable support for said elements, and means controlled by one set of the elements for automatically moving the support whereby to permit clearing one set of elements and actuation of another at an operation of the aforesaid mechanism.

19. In a machine of the class described, the combination with a set of actuators, of a plurality of sets of totalizer elements, a support for the totalizer elements movable to position a desired set of elements in operative relationship to the actuators, and means controlled by one set of totalizer elements for moving the totalizer support during an operation whereby to successively establish operative relationship between a plurality of sets of totalizer elements and the actuators.

20. In a machine of the class described, the combination with totalizer actuators, of a totalizer comprising adding and subtracting elements and movable relative to the actuators to establish operative relationship between either set of elements and the actuators, manipulative devices controlling the position of the totalizer relative to the actuators, and means controlled by the totalizer for moving the totalizer relative the actuators independently of the manipulative devices.

21. In a machine of the class described, the combination with totalizer actuators, of a totalizer comprising adding and subtracting elements and movable to establish operative relationship between either set of elements and the actuators, manipulative devices controlling the position of the totalizer relative to the actuators, and means controlled by the adding elements for automatically moving the totalizer relative the actuators independently of the manipulative devices.

22. In a machine of the class described, the combination with actuators, of a totalizer comprising adding and subtracting elements, a support for the totalizer movable relative the actuators to bring either set of elements in operative relationship to the actuators, a key and connections for moving the support in one direction, a spring for returning the support to a normal position when the key is released, and means controlled by the totalizer for moving the support independently of the key during an operation.

23. In a machine of the class described, the combination with a movable totalizer comprising adding and subtracting elements geared together for relative movement, of oscillatory actuators, means for moving the totalizer to effect engagement between either the adding or subtracting elements during movement of the latter in one direction whereby to enter items in the totalizer, means for moving the totalizer to effect engagement between the adding elements and the actuators during movement of the latter in the opposite direction to simultaneously set both sets of elements at zero and effect differential adjustment of the actuators, and means controlled by the totalizer for automatically moving the totalizer to effect engagement between the subtracting elements and the actuators during restoring movement of the latter.

24. In a machine of the class described, the combination with a set of actuators, of a plurality of sets of totalizer elements, a support for the totalizer elements movable to position a desired set of elements in operative relationship to the actuators, and means controlled by one of the totalizer elements for moving the totalizer support during an operation.

25. In a machine of the class described, the combination with a plurality of sets of totalizer elements, of operating mechanism therefor, and means controlled by one set of totalizer elements whereby amounts on a second set of elements may be transferred to the first set by an operation of the operating mechanism.

26. In a machine of the class described, the combination with a plurality of sets of totalizer elements, of operating mechanism therefor, and means controlled by one of the totalizer elements whereby amounts on one set of elements may be transferred to another by operation of the operating mechanism.

27. In a machine of the class described, the combination with a plurality of sets of totalizer elements, of item entering and total taking mechanism therefor, and means controlled by one of the totalizer elements for transferring the amount on one set of elements to another set in total taking operations.

28. In a machine of the class described, the combination with a plurality of sets of totalizer elements, of a set of actuators common thereto, operating devices for the actuators, and means controlled by one set of totalizer elements whereby amounts on another set of said elements may be transferred to the first set of elements by operation of the actuators.

29. In a machine of the class described, the combination with a plurality of sets of totalizer elements, of a set of oscillatory actuators common thereto, and means controlled by one set of totalizer elements whereby amounts may be transferred to said set of elements from another set by oscillation of the actuators.

30. In a machine of the class described, the combination with a plurality of sets of totalizer elements, of operating mechanism therefor, and means controlled by one set of totalizer elements whereby when the amount entered on a second set of elements exceeds the amount entered on the first set the first set will be cleared and then adjusted to show the amount of the excess.

31. In a machine of the class described, the combination with a single set of oscillatory actuators and means for operating same, of two sets of totalizer elements, means for effecting engagement of one set of elements with the actuators during movement of the latter in one direction whereby to clear said elements, and means controlled by said set of elements for automatically effecting engagement of the second set of elements with the actuators during movement of the actuators in the opposite direction.

32. In a machine of the class described, the combination with two sets of totalizer elements, of operating mechanism therefor, and means controlled by one set of elements whereby when the amount entered on the other set exceeds the amount entered on the first set all of the elements may first be cleared and the amount of the excess entered on the first set by operation of the operating mechanism.

33. In a machine of the class described, the combination with a plurality of sets of totalizer elements, of mechanism for entering items on said elements and for clearing same, and means controlled by one set of elements for transferring the amount on a second set of elements to the set first mentioned at a clearing operation.

34. In a machine of the class described, the combination with a plurality of sets of totalizer elements, of operating mechanism therefor, normally ineffective means controlled by one set of totalizer elements whereby the amount on another set of said elements may be transferred to the set of elements first mentioned at an operation of the operating mechanism, and manipulative devices operable to render said means effective.

35. In a machine of the class described, the combination with a plurality of sets of totalizer elements, of operating mechanism therefor, normally ineffective means controlled by one set of totalizer elements whereby the amount on another set of elements may be transferred to the set first mentioned at an operation, and an adjustable lever for rendering said means effective.

36. In a machine of the class described, the combiantion with a plurality of sets of totalizer elements, of totalizer actuating and clearing mechanism, means whereby one set of elements may be cleared and the amount entered on a second set by operation of said mechanism, and transfer devices tripped by the second set of elements as they pass from 0 to 1.

37. In a machine of the class described, the combination with a plurality of sets of totalizer elements, of totalizer actuating and clearing mechanism, means controlled by the totalizer elements whereby one set of elements may be cleared and the amount entered on a second set by operation of said mechanism, and transfer devices tripped by the second set of elements as they pass from 0 to 1.

38. In a machine of the class described, the combination with a plurality of sets of totalizer elements, of a set of actuators common thereto, operating devices for the actuators, means whereby one set of elements may be cleared and the amount entered on a second set by the actuators, and transfer devices tripped by the second set of elements as they pass from 0 to 1.

39. In a machine of the class described, the combination with a plurality of sets of totalizer elements, of a set of actuators common thereto, operating devices for the actuators, normally ineffective means whereby one set of elements may be cleared and the amount entered on a second set by the actuators, manipulative devices operable to render said means effective, and transfer devices tripped by the second set of elements as they pass from 0 to 1.

40. In a machine of the class described, the combination with a plurality of sets of totalizer elements, of a set of actuators common thereto, operating devices for the actuator, means controlled by the totalizer elements whereby one set of elements may be cleared and the amount entered on a second set by operation of the actuators, and transfer devices tripped by the second set of elements as they pass from 0 to 1.

41. In a machine of the class described, the combination with a plurality of sets of totalizer elements, of a set of actuators common thereto, operating devices for the actuators, normally ineffective means controlled by totalizer elements whereby one set of elements may be cleared and the amount entered on a second set by operation of the actuators, manipulative devices operable to render said means effective, and transfer devices tripped by the second set of elements as they pass from 0 to 1.

42. In a machine of the class described, the combinaiton with an adding and subtracting totalizer, of operating mechanism therefor, the construction and operation of said mechanism being such that the totalizer will be correctly set when the totalizer is in a positive condition and incorrectly set when negative, mechanism controlled by the totalizer for printing balances, and devices for effecting correct setting of the totalizer as an incident to and preliminary to printing a negative balance.

43. In a machine of the class described, the combination with an adding and subtracting totalizer, of operating mechanism therefor, the construction and operation of said mechanism being such that the totalizer will be correctly set when the totalizer is in a positive condition and incorrectly set when negative, mechanism controlled by the totalizer for printing balances, and devices controlled by the totalizer for automatically effecting correct setting of the totalizer as an incident to and preliminary to printing a negative balance.

44. In a machine of the class described, the combination with adding and subtracting mechanism comprising elements rotated in one direction in adding and in the opposite direction in subtracting, the construction and operation being such that said elements will be correctly set when the additions have exceeded the subtractions and incorrectly set when the contrary condition prevails, mechanism controlled by said elements for printing balances, and devices controlled by one of the elements for automatically effecting correct setting of the elements as an incident to and preliminary to printing the balance.

45. In a machine of the class described, the combination with adding and subtracting mechanism comprising elements rotated in one direction in adding and in the opposite direction in subtracting, the construction and operation being such that said elements will be correctly set when the additions have exceeded the subtractions and incorrectly set when the contrary condition prevails, mechanism controlled by said elements for printing balances, and devices whereby at a balance printing operation when the elements are incorrectly set said elements will first be turned to a neutral position and then set correctly as a preliminary to the printing.

46. In a machine of the class described, the combination with adding and subtracting mechanism comprising a set of elements rotated in one direction in adding and in the opposite direction in subtracting, the construction and operation being such that said elements will be correctly set when the additions have exceeded the subtractions and incorrectly set when the contrary condition prevails, mechanism controlled by said elements for printing balances, and mechanism controlled by the incorrectly set elements for first setting said elements at a neutral position and then setting them correctly to control the printing as a preliminary to the printing.

47. In a machine of the class described, the combination with adding and subtracting mechanism comprising elements rotated in one direction in adding and in the opposite direction in subtracting, the construction and operation being such that said elements will be correctly set when the additions have exceeded the subtractions and incorrectly set when the contrary condition prevails, mechanism controlled by said elements for printing balances, and devices also controlled by said elements whereby at a balance printing operation with the elements incorrectly set said elements will first be turned to a neutral position and then set correctly as a preliminary to the printing.

48. In a machine of the class described, the combination with adding and subtracting mechanism comprising elements rotated in one direction in adding and in the opposite direction in subtracting, the construction and operation being such that said elements will be correctly set when the additions have exceeded the subtractions and incorrectly set when the contrary condition prevails, mechanism controlled by said elements for printing balances, and devices controlled by one of the elements whereby at a balance printing operation when the elements are incorrectly set said elements will first be turned to a neutral position and then set correctly to control the printing as a preliminary to the printing.

49. In a machine of the class described, the combination with adding elements and subtracting elements, of mechanism for entering items thereon, total printing devices controlled by the adding elements, and means controlled by the subtracting elements whereby when the amounts entered on the subtracting elements have exceeded the amounts entered on the adding elements the adding elements will be automatically set to represent the negative total as a preliminary to printing said total.

50. In a machine of the class described, the combination with a set of adding elements and a set of subtracting elements, of mechanism for operating either set as desired, total printing devices invariably printing an amount corresponding to the setting of the adding elements, and means effective when the amounts entered on the subtracting elements have exceeded the amounts entered on the adding elements for setting the adding elements to show the negative total as a preliminary to printing said total.

51. In a machine of the class described, the combination with adding elements and subtracting elements, of mechanism for operating either set as desired, total printing devices invariably printing according to the setting of the adding elements, and means effective when the amounts entered on the subtracting elements have exceeded the amounts entered on the adding elements for automatically setting the adding elements to represent the negative total as a preliminary to printing said total.

52. In a machine of the class described, the combination with an adding and subtracting totalizer comprising a set of elements rotated in one direction in adding and in the opposite direction in subtracting, of operating mechanism therefor, the construction and operation of said mechanism being such that said elements will be correctly set when the totalizer is positive and incorrectly set when negative, total printing mechanism controlled by said elements, and mechanism effective when the rotatable elements are incorrectly set for first turning said elements to zero and then setting them correctly to represent the negative total as a preliminary to printing said total.

53. In a machine of the class described, the combination with a totalizer, of operating and clearing mechanism therefor, independent devices for engaging the totalizer with said mechanism at different points in the operation of the latter, manipulative devices normally controlling the engaging devices, and means whereby control of the engaging devices may be transferred to the totalizer by operation of the manipulative devices.

54. In a machine of the class described, the combination with a totalizer, of operating and clearing mechanism therefor, independent devices for engaging the totalizer with said mechanism at different points in an operation of the latter, manipulative devices operable to render either one of the engaging devices effective at an operation, and means controlled by the totalizer whereby both of the engaging devices may be rendered effective at the same operation.

55. In a machine of the class described, the combination with oscillatory actuators, of a totalizer, means for engaging the totalizer with the actuators during movement of the latter in one direction, means for engaging the totalizer with the actuators during movement of the latter in the opposite direction, manipulative devices and connections for adjusting either of said means to effective position and the other to ineffective position, and devices controlled by the totalizer for disabling the connections and adjusting the engaging means independently of the manipulative devices.

56. In a machine of the class described, the combination with oscillatory actuators, of a totalizer, means for engaging the totalizer with the actuators during movement of the latter in one direction to effect actuation of the totalizer, means for engaging the totalizer with the actuators during movement of the latter in the opposite direction to effect clearing of the totalizer, manipulative devices operable to render either of said means effective and the other ineffective during an operation as desired, and devices controlled by the totalizer whereby both of said means are successively rendered effective during an operation.

57. In a machine of the class described, the combination with oscillatory actuators, of a totalizer, means for engaging the totalizer with the actuators during movement of the latter in one direction, means for engaging the totalizer with the actuators during movement of the latter in the opposite direction, a lever and connections for adjusting either of said means to effective position and the other to ineffective position, and devices controlled by the totalizer for disabling the connections and adjusting the engaging means independently of the lever.

58. In a machine of the class described, the combination with oscillatory actuators, of a totalizer, means for engaging the totalizer with the actuators during movement of the latter in one direction to effect actuation of the totalizer, means for engaging the totalizer with the actuators during movement of the latter in the opposite direction to effect clearing of the totalizer, manipulative devices for controlling the engaging means, and devices whereby the totalizer also controls the engaging means.

59. In a machine of the class described, the combination with an adding and subtracting totalizer, of operating and clearing mechanism therefor, independent devices for engaging the totalizer with said mechanism at different points in the operation of the latter, manipulative devices normally controlling the engaging devices, and means controlled by the totalizer for rendering one of the engaging devices effective independently of the manipulative devices.

60. In a machine of the class described, the combination with an adding and subtracting totalizer, of operating and clearing mechanism therefor, independent devices for effecting engagement between the totalizer and said mechanism at different points in the operation of the latter, an adjustable lever normally controlling the engaging devices, and means whereby control of the engaging devices may be transferred to the adding and subtracting totalizer by adjustment of the lever.

61. In a machine of the class described, the combination with an adding and subtracting totalizer, of operating and clearing mechanism therefor, two pitmen each constructed to engage the totalizer with said mechanism at a different point in the operation of the latter, an adjustable lever, connections whereby either pitman may be rendered effective and the other ineffective by adjustment of the lever, and means controlled by the totalizer for disabling said connections and adjusting the pitmen independently of the lever.

62. In a machine of the class described, the combination with an accounting device, means for actuating the same, a driving mechanism therefor constructed to be given a variable movement, and means whereby the accounting device controls the variable movement of the driving mechanism.

63. In a machine of the class described, the combination with an accounting device comprising a rotatable element, of a driving mechanism therefor constructed to be given a variable period of movement, and means whereby the rotatable element controls the length of period of movement of the driving mechanism.

64. In a machine of the class described, the combination with accounting devices comprising a totalizer, totalizer actuating means, a main driving mechanism constructed to be given a variable movement, and means whereby the totalizer controls the variable movement of the driving mechanism.

65. In a machine of the class described, the combination with a rotatable totalizer element, of a main driving mechanism constructed to be given a variable period of movement, and means whereby the rotatable element controls the length of period of movement of the driving mechanism.

66. In a machine of the class described, the combination with accounting devices comprising a totalizer, of a main driving mechanism constructed to be given a variable movement, means requiring operation of the driving mechanism for taking totals, and means whereby the totalizer controls the extent of movement of the driving mechanism in total taking operations.

67. In a machine of the class described, the combination with totalizing mechanism, of an operating mechanism therefor operable one or more cycles at a time, and means whereby the totalizing mechanism controls the cyclic operation of the operating mechanism.

68. In a machine of the class described, the combination with accounting mechanism comprising an adding and subtracting totalizer, of a main operating device for said mechanism constructed to be given a variable movement, and means whereby the adding and subtracting totalizer controls the extent of movement of the driving mechanism.

69. In a machine of the class described, the combination with accounting devices comprising an adding and subtracting totalizer, of a main operating device therefor constructed to be given a variable movement, means requiring operation of the main operating device for taking totals, and means whereby the adding and subtracting totalizer controls the extent of movement of the operating device in total taking operations.

70. In a machine of the class described, the combination with an adding and subtracting mechanism comprising a rotatable element, of means for rotating said element in one direction when amounts are added and in the opposite direction when amounts are subtracted, a main operating mechanism constructed to be given a variable extent of movement, and means whereby the position of the rotatable element controls the extent of movement of the driving mechanism.

71. In a machine of the class described, the combination with a variably operable driving mechanism, of an adding and subtracting totalizer, devices for entering adding and subtracting items in the totalizer, means for printing totals by operation of the driving mechanism, and means whereby said driving mechanism will have one cycle of movement in positive total printing and two cycles of movement in negative total printing operations.

72. In a machine of the class described, the combination with an adding and subtracting totalizer, of a driving mechanism therefor constructed to be given either one or two cycles of movement at an operation, a stop normally effective to stop the mechanism at the end of one cycle of movement, means controlled by the totalizer for disabling the stop at the end of one cycle of movement to permit a second cycle of movement, and means for restoring the stop to normal condition at the end of the second cycle of movement.

73. In a machine of the class described, the combination with an adding and subtracting totalizer, of a driving mechanism therefor comprising a rotatable shaft, means normally stopping the shaft at the end of a rotation, means controlled by the totalizer for disabling the stop at the end of a rotation whereby to permit a second rotation of the shaft, and means for restoring the stop to normal condition at the end of the second rotation.

74. In a machine of the class described, the combination with an adding and subtracting totalizer, of type carriers, means for taking impressions from the type carriers, and connections whereby the adding and subtracting totalizer controls the impression means.

75. In a machine of the class described, the combination with a driving mechanism, of an adding and subtracting totalizer, type carriers, a platen for taking impressions from the type carriers, means for connecting and disconnecting the platen and driving mechanism, and devices whereby the totalizer controls said means.

76. In a machine of the class described, the combination with a totalizer comprising a set of adding and a set of subtracting elements, of type carriers, a platen carrier, an invariably moved element, a pawl operable to connect and disconnect the platen carrier and the invariably moved element, and devices controlled by one of the totalizer elements for operating said pawl.

77. In a machine of the class described, the combination with a totalizer comprising adding and subtracting elements, of type carriers, a platen carrier, an invariably moved element, a pawl movable to connect and disconnect the platen carrier and the invariably moved element, and devices controlled by the adding elements of the totalizer for operating said pawl.

78. In a machine of the class described, the combination with an adding and subtracting totalizer, of operating mechanism therefor, type carriers, means for transferring totals from the totalizer to the type carriers, said means operating when the total is negative to first set up on the type carriers an incorrect amount and then the correct negative total, an impression device, and means automatically disabling the impression device when the amount on the type carriers is incorrect.

79. In a machine of the class described, the combination with an adding and subtracting totalizer, of operating mechanism therefor, type carriers, means for setting up on the type carriers the difference between amounts added and amounts subtracted, said means operating when the subtractions have exceeded the additions to first set up on the type carriers an incorrect amount and then the correct amount, a platen, and means automatically disabling the platen when the amount on the type carriers is incorrect and enabling it when the amount is correct.

80. In a machine of the class described, the combination with an adding and subtracting totalizer, of operating mechanism therefor, type carriers, means for transferring totals from the totalizer to the type carriers, said means operating when the total is negative to first set up on the type carriers an incorrect amount and then the correct negative total, an impression device, and, means controlled by the totalizer for disabling the impression device when the amount on the type carriers is incorrect.

81. In a machine of the class described, the combination with an adding and subtracting totalizer, of operating mechanism therefor, type carriers, means for setting up on the type carriers the difference between the amounts added and the amounts subtracted, said means operating when the subtractions have exceeded the additions to first set up on the type carriers an incorrect amount and then the correct amount, a platen, and means controlled by the totalizer for disabling the platen when the amount on the type carriers is incorrect and enabling it when the amount is correct.

82. In a machine of the class described, the combination with an operating mechanism, of an adding and subtracting totalizer, type carriers, means controlled by the totalizer for setting up on the type carriers either positive or negative totals according to the condition of the totalizer, said means requiring an operation of the operating mechanism when the totalizer is in a positive condition and two operations when the totalizer is negative, a platen normally operated at each operation of the operating mechanism, and means controlled by the totalizer for disabling the platen during the first of the two operations to set up a negative total.

83. In a machine for performing additions and subtractions by direct process, the combination of a set of numeral elements to be advanced in adding and moved backward in subtracting, means for operating said elements to present correct positive or negative totals at a line common to the elements, and means for printing the totals.

84. In a machine for performing additions and subtractions by direct process, the combination of a totalizer comprising a set of numeral elements to be advanced in adding and moved in a reverse direction in subtracting, manipulative devices, means controlled by the manipulative devices for operating said elements to present either a positive or a negative total at the same line across the elements, type carriers, and means controlled by the numeral elements for setting the type carriers to print totals.

85. In a machine for performing additions and subtractions by direct process, the combination with a totalizer comprising adding elements and subtracting elements having a complemental relation to each other and geared together in pairs for relative movement, of means for entering items in the totalizer by driving either the adding or the subtracting elements, said means operating to set the totalizer with the adding elements representing correctly the positive total when the totalizer is in a positive condition and the complement of an incorrect negative amount when the totalizer is in negative condition, and means for setting the adding elements to represent correctly the true negative total when it is desired to ascertain said negative total.

86. In a machine for performing additions and subtractions by direct process, the combination with a totalizer susceptible to positive and negative entries, of mechanism for making either positive or negative entries on the totalizer, said mechanism being so constructed as to cause the higher order elements of the totalizer to be incorrectly set when the total of the negative entries runs in excess of the total of the positive entries, and devices for correcting the setting of said higher order elements to ascertain the true negative total.

87. In a machine for performing additions and subtractions by direct process, the combination with a totalizer susceptible to positive and negative entries, of mechanism for making either positive or negative entries on the totalizer, said mechanism being so constructed as to cause the higher order elements of the totalizer to be incorrectly set when the total of the negative entries runs in excess of the positive entries, and devices rendered effective when the positive total is exceeded for automatically correcting the setting of the higher order totalizer elements to ascertain the true negative total.

88. In a machine for performing additions and subtractions by direct process, the combination with a totalizer constructed to operate back and forth through and at either side of zero, of operating mechanism therefor comprising devices effecting either carrying or borrowing, said devices operating when the totalizer passes through zero in the negative direction to effect an incorrect setting of the higher order elements of the totalizer, and means controlled by the totalizer for correcting the setting of said elements.

89. In a machine for performing additions and subtractions by direct process, the combination with a totalizer susceptible to positive and negative entries, of mechanism for making either positive or negative entries on the totalizer, said mechanism comprising totalizer actuators and carrying devices operating to set the higher order elements of the totalizer incorrectly to represent the result of operations when said result is negative, and devices controlled by the totalizer whereby the totalizer may be set correctly by operation of the actuators and carrying devices to show true negative totals.

90. In a machine for performing additions and subtractions by direct process, the combination with a totalizer constructed to operate back and forth through and at either the positive or the negative side of zero, of mechanism for entering either positive or negative items on the totalizer, said mechanism effecting incorrect setting of the higher order totalizer elements when the totalizer passes through zero in the negative direction, total taking mechanism, and devices automatically correcting the setting of the higher order totalizer elements in total taking.

91. In a machine for performing additions and subtractions by direct process, the combination with a totalizer constructed to operate back and forth through and at either side of zero, of operating mechanism therefor so constructed as to set all of the higher order denominational elements incorrectly to represent the result of operations when the totalizer passes to the negative side of zero, total printing mechanism, and devices rendered effective by operation of the total printing mechanism for setting the totalizer correctly as a preliminary to printing negative totals.

92. In a machine for performing additions and subtractions by direct process, the combination with a totalizer susceptible to positive and negative entries, of mechanism for entering either positive or negative items on the totalizer, said mechanism being so constructed as to cause the higher order elements of the totalizer to be incorrectly set when the total of the negative entries runs in excess of the total of the positive entries, devices for printing positive and negative totals from the totalizer, means effective when the totalizer is in a negative condition for preventing the printing of the total until the setting of the higher order totalizer elements has been corrected, and means for correcting the setting of said elements.

93. In a machine for performing additions and subtractions by direct process, the combination with a totalizer susceptible to positive and negative entries, of mechanism for entering either positive or negative items on the totalizer, said mechanism being so constructed as to cause the higher order elements of the totalizer to be incorrectly set when the total of the negative entries runs in excess of the total of the positive entries, devices for printing positive and negative totals from the totalizer, means controlled by the totalizer and effective when the totalizer is in a negative condition for preventing the printing of the total until the setting of the higher order totalizer elements has been corrected, and means controlled by the totalizer for automatically correcting the setting of the totalizer elements.

94. In a machine of the class described, the combination with a totalizer, of totalizer actuators, devices for engaging the totalizer with the actuators, total taking mechanism including means for engaging the totalizer and actuators a plurality of times in total taking operations, and means whereby the totalizer controls the engaging devices in total taking.

95. In a machine of the class described, the combination with totalizer actuators, of a totalizer comprising adding and subtracting elements and movable to effect engagement of either the adding or the subtracting elements with the actuators, means for effecting said movements of the totalizer, and devices whereby the totalizer controls said means.

96. In a machine of the class described, the combination with totalizer actuators, of totalizer elements, a movable support in which said elements are mounted, means for engaging the totalizer elements and actuators a plurality of times in total taking operations, and means controlled by the totalizer in total taking for effecting the engagements of the totalizer elements and actuators.

97. In a machine of the class described, the combination with totalizer actuators, of totalizer elements, a movable support in which said elements are mounted, means for engaging the totalizer elements and actuators a plurality of times in total taking operations, and means controlled by the totalizer for automatically moving the totalizer support relative to the actuators to effect the necessary engagements in total taking operations.

98. In a machine of the class described, the combination with totalizer actuators, of a plurality of groups of totalizer elements, a support for the totalizer elements movable relative to the actuators to bring the desired group of elements in position to be actuated, and means controlled by the totalizer elements for effecting movement of the support relative to the actuators.

99. In a machine of the class described, the combination with totalizer actuators, of a plurality of groups of totalizer elements, a support for the totalizer elements movable relative to the actuators to bring the desired group of elements in position to be actuated, total taking devices, and means controlled by the totalizer elements for effecting movement of the totalizer support relative to the actuators in total taking operations.

100. In a machine for performing additions and subtractions by direct process, the combination with oscillatory totalizer actuators, of a movable totalizer comprising adding and subtracting elements, means for moving the totalizer to position either the adding or the subtracting elements in co-operative relationship with the actuators, means for engaging the positioned elements with the actuators during movement of the latter in either direction, and connections whereby the totalizer controls both the moving and the engaging means.

101. In a machine for performing additions and subtractions by direct process, the combination of a set of numeral elements to be advanced in adding and moved backward in subtracting, means for operating said elements to position correct positive or negative totals at a line common to the elements, printing mechanism, and means for setting said printing mechanism commensurate with said totals directly from one setting to another.

102. In a machine for performing additions and subtractions by direct process, the combination with a totalizer constructed to operate back and forth and at either side of zero, of operating mechanism therefor comprising devices effecting either carrying or borrowing, said devices operating when the totalizer passes through zero in the negative direction to effect an incorrect setting of the higher order elements of the totalizer when the result is negative, and means controlled by the totalizer for correcting the setting of said elements.

In testimony whereof I affix my signature.

HAAKON A. MARTIN.